United States Patent
Bishop et al.

(10) Patent No.: US 7,705,732 B2
(45) Date of Patent: *Apr. 27, 2010

(54) AUTHENTICATING AN RF TRANSACTION USING A TRANSACTION COUNTER

(76) Inventors: Fred Bishop, 5511 W. Aster, Glendale, AZ (US) 85304; Peter D Saunders, 3710 E. Palisade Dr., Salt Lake City, UT (US) 84109

( * ) Notice: Subject to any disclaimer, the term of this patent is extended or adjusted under 35 U.S.C. 154(b) by 1246 days.

This patent is subject to a terminal disclaimer.

(21) Appl. No.: 10/905,005

(22) Filed: Dec. 9, 2004

(65) Prior Publication Data

US 2006/0012473 A1 Jan. 19, 2006

Related U.S. Application Data

(63) Continuation-in-part of application No. 10/711,720, filed on Sep. 30, 2004, and a continuation-in-part of application No. 10/708,545, filed on Mar. 10, 2004, and a continuation-in-part of application No. 10/340,352, filed on Jan. 10, 2003, and a continuation-in-part of application No. 10/192,488, filed on Jul. 9, 2002, now Pat. No. 7,239,226.

(60) Provisional application No. 60/507,803, filed on Sep. 30, 2003, provisional application No. 60/396,577, filed on Jul. 16, 2002, provisional application No. 60/304,216, filed on Jul. 10, 2001.

(51) Int. Cl.
*G08B 13/14* (2006.01)

(52) U.S. Cl. ............... 340/572.1; 340/5.4; 340/568.1; 705/22; 705/35; 705/64

(58) Field of Classification Search ............... 340/5.4, 340/5.2, 5.1, 5.6, 5.61, 5.51, 5.81, 5.8, 568.1, 340/572.1; 235/375, 380, 472.01, 472.02, 235/454, 439; 705/35, 39, 44, 50, 64, 16, 705/22

See application file for complete search history.

(56) References Cited

U.S. PATENT DOCUMENTS

D061,466 S 9/1922 Foltz (Continued)

FOREIGN PATENT DOCUMENTS

CA 2300241 9/2000

(Continued)

OTHER PUBLICATIONS

International Search Report and Written Opinion of the International Searching Authority, PCT/US05/26067, May 23, 2007.

(Continued)

*Primary Examiner*—Daniel Previl
(74) *Attorney, Agent, or Firm*—Snell & Wilmer L.L.P.

(57) ABSTRACT

A system and method for securing a Radio Frequency (RF) transaction using a RF identification device (RFID) transaction device is provided. RFID transaction device includes a transactions counter for tallying the number of transactions attempted or completed with the RFID transactions device. Counter value is used to create a RFID device authentication tag for use in validating the RFID device. A RFID reader, interacting with the RFID device, provides a random number to the RFID device which may be used in the RFID device authentication tag creation and validation. RFID reader may also use counter value and random number to create a RFID reader authentication key useful for validating RFID reader. RFID transaction device may include an encryption key for creating RFID transaction device authentication tag. Likewise, RFID reader may include a RFID reader encryption key for creating RFID reader authentication tag.

23 Claims, 5 Drawing Sheets

U.S. PATENT DOCUMENTS

| | | |
|---|---|---|
| 2,767,756 A | 10/1956 | Niles |
| 3,446,260 A | 5/1969 | Osher |
| 3,536,894 A | 10/1970 | Travioli |
| 3,573,731 A | 4/1971 | Schwend |
| 3,725,647 A | 4/1973 | Retzky |
| 3,763,356 A | 10/1973 | Berler |
| 3,829,662 A | 8/1974 | Furahashi |
| 3,838,252 A | 9/1974 | Hynes et al. |
| 3,873,813 A | 3/1975 | Lahr et al. |
| 3,894,756 A | 7/1975 | Ward |
| 3,929,177 A | 12/1975 | Reis |
| 3,955,295 A | 5/1976 | Mayer |
| 4,044,231 A | 8/1977 | Beck et al. |
| 4,048,737 A | 9/1977 | McDermott |
| 4,056,139 A | 11/1977 | Murt |
| 4,058,839 A | 11/1977 | Darjany |
| 4,119,361 A | 10/1978 | Greenaway |
| 4,202,491 A | 5/1980 | Suzuki |
| 4,222,516 A | 9/1980 | Badet et al. |
| 4,277,863 A | 7/1981 | Faneuf |
| 4,303,904 A | 12/1981 | Chasek |
| 4,356,646 A | 11/1982 | Johnson, Jr. |
| 4,361,757 A | 11/1982 | Ehrat |
| D270,303 S | 8/1983 | Zautner |
| D270,546 S | 9/1983 | Malmberg |
| 4,436,991 A | 3/1984 | Albert et al. |
| 4,450,535 A | 5/1984 | dePommery et al. |
| 4,475,308 A | 10/1984 | Heise et al. |
| 4,504,084 A | 3/1985 | Jauch |
| 4,507,652 A | 3/1985 | Vogt et al. |
| D280,214 S | 8/1985 | Opel |
| 4,538,059 A | 8/1985 | Rudland |
| 4,547,002 A | 10/1985 | Colgate, Jr. |
| 4,563,024 A | 1/1986 | Blyth |
| 4,581,523 A | 4/1986 | Okuno |
| 4,583,766 A | 4/1986 | Wessel |
| 4,597,814 A | 7/1986 | Colgate, Jr. |
| 4,639,765 A | 1/1987 | dHont |
| 4,641,017 A | 2/1987 | Lopata |
| 4,643,452 A | 2/1987 | Chang |
| 4,672,021 A | 6/1987 | Blumel et al. |
| 4,684,795 A | 8/1987 | Colgate, Jr. |
| 4,692,394 A | 9/1987 | Drexler |
| 4,694,148 A | 9/1987 | Diekemper et al. |
| 4,697,073 A | 9/1987 | Hara |
| 4,697,363 A | 10/1987 | Gamm |
| 4,711,690 A | 12/1987 | Haghiri-Tehrani |
| 4,739,328 A | 4/1988 | Koelle et al. |
| 4,768,811 A | 9/1988 | Oshikoshi et al. |
| 4,779,898 A | 10/1988 | Berning et al. |
| 4,794,142 A | 12/1988 | Alberts et al. |
| 4,801,790 A | 1/1989 | Solo |
| 4,841,570 A | 6/1989 | Cooper |
| 4,852,911 A | 8/1989 | Hoppe |
| 4,853,525 A | 8/1989 | Vogt et al. |
| 4,863,819 A | 9/1989 | Drexler et al. |
| 4,889,366 A | 12/1989 | Fabbiani |
| 4,897,533 A | 1/1990 | Lyszczarz |
| 4,897,947 A | 2/1990 | Kass-Pious |
| 4,917,292 A | 4/1990 | Drexler |
| D307,979 S | 5/1990 | Purvis |
| 4,937,963 A | 7/1990 | Barnes |
| D310,386 S | 9/1990 | Michels et al. |
| 4,961,142 A | 10/1990 | Elliott et al. |
| 5,004,899 A | 4/1991 | Ueda |
| 5,010,243 A | 4/1991 | Fukushima et al. |
| 5,015,830 A | 5/1991 | Masuzawa et al. |
| 5,016,274 A | 5/1991 | Micali et al. |
| 5,023,782 A | 6/1991 | Lutz et al. |
| 5,023,908 A | 6/1991 | Weiss |
| 5,025,372 A | 6/1991 | Burton et al. |
| 5,052,328 A | 10/1991 | Eppenbach |
| 5,053,774 A | 10/1991 | Schuermann et al. |
| 5,068,894 A | 11/1991 | Hoppe |
| 5,096,228 A | 3/1992 | Rinderknecht |
| 5,101,200 A | 3/1992 | Swett |
| 5,106,125 A | 4/1992 | Antes |
| 5,111,033 A | 5/1992 | Fujita et al. |
| 5,142,383 A | 8/1992 | Mallik |
| 5,171,039 A | 12/1992 | Dusek |
| 5,192,947 A | 3/1993 | Neustein |
| 5,197,140 A | 3/1993 | Balmer |
| 5,202,826 A | 4/1993 | McCarthy |
| 5,212,777 A | 5/1993 | Gove et al. |
| 5,217,844 A | 6/1993 | Fukushima et al. |
| 5,221,838 A | 6/1993 | Gutman et al. |
| 5,222,282 A | 6/1993 | Sukonnik et al. |
| 5,226,989 A | 7/1993 | Sukonnik |
| 5,239,654 A | 8/1993 | IngSimmons et al. |
| 5,247,304 A | 9/1993 | dHont |
| 5,251,937 A | 10/1993 | Ojster |
| 5,256,473 A | 10/1993 | Kotani et al. |
| 5,272,326 A | 12/1993 | Fujita et al. |
| 5,274,392 A | 12/1993 | dHont et al. |
| 5,279,019 A | 1/1994 | Knickle |
| 5,285,100 A | 2/1994 | Byatt |
| 5,288,978 A | 2/1994 | Iijima |
| 5,300,764 A | 4/1994 | Hoshino et al. |
| 5,305,002 A | 4/1994 | Holodak et al. |
| 5,311,679 A | 5/1994 | Birch, Sr. |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,350,906 A | 9/1994 | Brody et al. |
| 5,351,052 A | 9/1994 | dHont et al. |
| 5,351,142 A | 9/1994 | Cueli |
| 5,355,411 A | 10/1994 | MacDonald |
| 5,371,896 A | 12/1994 | Gove et al. |
| 5,373,303 A | 12/1994 | dHont |
| 5,383,687 A | 1/1995 | Suess et al. |
| 5,407,893 A | 4/1995 | Koshizuka et al. |
| 5,408,243 A | 4/1995 | dHont |
| 5,410,142 A | 4/1995 | Tsuboi et al. |
| 5,410,649 A | 4/1995 | Gove |
| 5,428,363 A | 6/1995 | dHont |
| 5,453,601 A | 9/1995 | Rosen |
| 5,453,747 A | 9/1995 | dHont et al. |
| 5,461,219 A | 10/1995 | Cronvall |
| 5,471,592 A | 11/1995 | Gove et al. |
| 5,477,038 A | 12/1995 | Levine et al. |
| 5,478,629 A | 12/1995 | Norman |
| 5,479,494 A | 12/1995 | Clitherow |
| 5,479,530 A | 12/1995 | Nair et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | dHont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | dHont |
| 5,500,513 A | 3/1996 | Langhans et al. |
| 5,500,651 A | 3/1996 | Schuermann |
| 5,506,395 A | 4/1996 | Eppley |
| 5,513,525 A | 5/1996 | Schurmann |
| 5,514,860 A | 5/1996 | Berson |
| 5,516,153 A | 5/1996 | Kaule |
| 5,518,810 A | 5/1996 | Nishihara et al. |
| 5,519,381 A | 5/1996 | Marsh et al. |
| 5,520,230 A | 5/1996 | Sumner, III |
| 5,522,083 A | 5/1996 | Gove et al. |

| | | | | | |
|---|---|---|---|---|---|
| 5,525,992 A | 6/1996 | Froschermeier | 5,694,596 A | 12/1997 | Campbell |
| 5,525,994 A | 6/1996 | Hurta et al. | 5,696,913 A | 12/1997 | Gove et al. |
| 5,530,232 A | 6/1996 | Taylor | 5,697,649 A | 12/1997 | Dames et al. |
| 5,537,314 A | 7/1996 | Kanter | 5,698,837 A | 12/1997 | Furuta |
| 5,541,604 A | 7/1996 | Meier | 5,699,528 A | 12/1997 | Hogan |
| 5,543,798 A | 8/1996 | Schuermann | 5,700,037 A | 12/1997 | Keller |
| 5,544,246 A | 8/1996 | Mandelbaum et al. | 5,701,127 A | 12/1997 | Sharpe |
| 5,548,291 A | 8/1996 | Meier et al. | 5,704,046 A | 12/1997 | Hogan |
| 5,550,536 A | 8/1996 | Flaxl | 5,705,101 A | 1/1998 | Oi et al. |
| 5,550,548 A | 8/1996 | Schuermann | 5,705,798 A | 1/1998 | Tarbox |
| 5,552,789 A | 9/1996 | Schuermann | 5,705,852 A | 1/1998 | Orihara et al. |
| 5,557,279 A | 9/1996 | dHont | 5,708,422 A * | 1/1998 | Blonder et al. ............. 340/5.41 |
| 5,557,516 A | 9/1996 | Hogan | 5,710,421 A | 1/1998 | Kokubu |
| 5,561,430 A | 10/1996 | Knebelkamp | 5,715,399 A | 2/1998 | Bezos |
| 5,563,582 A | 10/1996 | dHont | 5,720,500 A | 2/1998 | Okazaki et al. |
| 5,569,187 A | 10/1996 | Kaiser | 5,721,781 A | 2/1998 | Deo et al. |
| 5,572,815 A | 11/1996 | Kovner | 5,724,424 A | 3/1998 | Gifford |
| 5,575,094 A | 11/1996 | Leake et al. | 5,725,098 A | 3/1998 | Seifert et al. |
| 5,577,109 A | 11/1996 | Stimson et al. | 5,727,140 A | 3/1998 | Ohtomo et al. |
| 5,577,120 A | 11/1996 | Penzias | 5,727,696 A | 3/1998 | Valiulis |
| 5,577,609 A | 11/1996 | Hexter | 5,729,053 A | 3/1998 | Orthmann |
| 5,578,808 A | 11/1996 | Taylor | 5,729,236 A | 3/1998 | Flaxl |
| 5,581,630 A | 12/1996 | Bonneau, Jr. | 5,731,957 A | 3/1998 | Brennan |
| 5,585,787 A | 12/1996 | Wallerstein | 5,732,579 A | 3/1998 | dHont et al. |
| 5,590,038 A * | 12/1996 | Pitroda ........................ 705/41 | 5,734,838 A | 3/1998 | Robinson et al. |
| 5,592,150 A | 1/1997 | dHont | 5,737,439 A | 4/1998 | Lapsley et al. |
| 5,592,405 A | 1/1997 | Gove et al. | 5,739,512 A | 4/1998 | Tognazzini |
| 5,592,767 A | 1/1997 | Treske | 5,742,756 A | 4/1998 | Dillaway et al. |
| 5,594,227 A | 1/1997 | Deo | 5,742,845 A | 4/1998 | Wagner |
| 5,594,233 A | 1/1997 | Kenneth et al. | 5,745,571 A | 4/1998 | Zuk |
| 5,594,448 A | 1/1997 | dHont | 5,748,137 A | 5/1998 | dHont |
| 5,597,534 A | 1/1997 | Kaiser | 5,748,737 A | 5/1998 | Daggar |
| 5,600,175 A | 2/1997 | Orthmann | 5,757,917 A | 5/1998 | Rose et al. |
| 5,602,538 A | 2/1997 | Orthmann et al. | 5,758,195 A | 5/1998 | Balmer |
| 5,602,919 A | 2/1997 | Hurta et al. | 5,761,306 A | 6/1998 | Lewis |
| 5,604,342 A | 2/1997 | Fujioka | 5,761,493 A | 6/1998 | Blakeley et al. |
| 5,606,520 A | 2/1997 | Gove et al. | 5,764,789 A | 6/1998 | Pare, Jr. et al. |
| 5,606,594 A | 2/1997 | Register et al. | 5,768,385 A | 6/1998 | Simon |
| 5,607,522 A | 3/1997 | McDonnell | 5,768,609 A | 6/1998 | Gove et al. |
| 5,608,203 A | 3/1997 | Finkelstein et al. | 5,769,457 A | 6/1998 | Warther |
| 5,608,406 A | 3/1997 | Eberth et al. | 5,770,843 A | 6/1998 | Rose et al. |
| 5,608,778 A | 3/1997 | Partridge, III | 5,773,812 A | 6/1998 | Kreft |
| 5,611,965 A | 3/1997 | Shouji et al. | 5,774,882 A | 6/1998 | Keen et al. |
| 5,613,001 A | 3/1997 | Bakhoum | 5,777,903 A | 7/1998 | Piosenka |
| 5,613,131 A | 3/1997 | Moss et al. | 5,778,067 A | 7/1998 | Jones et al. |
| 5,613,146 A | 3/1997 | Gove et al. | 5,778,069 A | 7/1998 | Thomlinson et al. |
| 5,614,703 A | 3/1997 | Martin et al. | 5,778,173 A | 7/1998 | Apte |
| 5,619,207 A | 4/1997 | dHont | 5,785,680 A | 7/1998 | Niezink et al. |
| 5,621,199 A | 4/1997 | Calari et al. | 5,786,587 A | 7/1998 | Colgate, Jr. |
| 5,621,396 A | 4/1997 | Flaxl | 5,789,733 A | 8/1998 | Jachimowicz et al. |
| 5,621,411 A | 4/1997 | Hagl et al. | 5,791,474 A | 8/1998 | Hansen |
| 5,621,412 A * | 4/1997 | Sharpe et al. ............ 340/10.33 | 5,792,337 A | 8/1998 | Padovani et al. |
| 5,625,366 A | 4/1997 | dHont | 5,793,324 A | 8/1998 | Aslanidis et al. |
| 5,625,370 A | 4/1997 | dHont | 5,794,095 A | 8/1998 | Thompson |
| 5,625,695 A | 4/1997 | MRaihi et al. | 5,796,831 A | 8/1998 | Paradinas et al. |
| 5,629,981 A | 5/1997 | Nerlikar | 5,797,060 A | 8/1998 | Thompson |
| 5,638,080 A | 6/1997 | Orthmann et al. | 5,797,085 A | 8/1998 | Beuk et al. |
| 5,640,002 A | 6/1997 | Ruppert et al. | 5,797,133 A | 8/1998 | Jones et al. |
| 5,641,050 A | 6/1997 | Smith et al. | 5,798,709 A | 8/1998 | Flaxl |
| 5,646,607 A | 7/1997 | Schurmann et al. | 5,799,087 A | 8/1998 | Rosen |
| 5,649,118 A | 7/1997 | Carlisle et al. | 5,806,045 A | 9/1998 | Biorge et al. |
| 5,657,388 A | 8/1997 | Weiss | 5,808,758 A | 9/1998 | Solmsdorf |
| 5,660,319 A | 8/1997 | Falcone et al. | 5,809,142 A | 9/1998 | Hurta et al. |
| 5,665,439 A | 9/1997 | Andersen et al. | 5,809,288 A | 9/1998 | Balmer |
| 5,668,876 A | 9/1997 | Falk et al. | 5,809,633 A | 9/1998 | Mundigl et al. |
| 5,673,106 A | 9/1997 | Thompson | 5,815,252 A | 9/1998 | Price-Francis |
| D384,971 S | 10/1997 | Kawan | 5,815,657 A | 9/1998 | Williams et al. |
| 5,675,342 A | 10/1997 | Sharpe | 5,823,359 A | 10/1998 | Harris et al. |
| 5,677,953 A | 10/1997 | Dolphin | 5,825,007 A | 10/1998 | Jesadanont |
| 5,686,920 A | 11/1997 | Hurta et al. | 5,825,302 A | 10/1998 | Stafford |
| 5,689,100 A | 11/1997 | Carrithers et al. | 5,826,077 A | 10/1998 | Blakeley et al. |
| 5,691,731 A | 11/1997 | van Erven | 5,826,241 A | 10/1998 | Stein et al. |
| 5,692,132 A | 11/1997 | Hogan | 5,826,242 A | 10/1998 | Montulli |

| | | | | | | |
|---|---|---|---|---|---|---|
| 5,826,243 A | 10/1998 | Musmanno et al. | | 5,917,913 A * | 6/1999 | Wang .................... 705/67 |
| 5,828,044 A | 10/1998 | Jun et al. | | 5,917,925 A | 6/1999 | Moore |
| 5,834,756 A | 11/1998 | Gutman et al. | | 5,918,216 A | 6/1999 | Miksovsky et al. |
| 5,835,894 A | 11/1998 | Adcock et al. | | 5,920,058 A | 7/1999 | Weber et al. |
| 5,838,257 A | 11/1998 | Lambropoulos | | 5,920,628 A | 7/1999 | Indeck et al. |
| 5,838,720 A | 11/1998 | Morelli | | 5,920,629 A | 7/1999 | Rosen |
| 5,838,812 A | 11/1998 | Pare et al. | | 5,920,847 A | 7/1999 | Kolling et al. |
| 5,841,364 A | 11/1998 | Hagl et al. | | 5,923,734 A | 7/1999 | Taskett |
| 5,842,088 A | 11/1998 | Thompson | | 5,923,884 A | 7/1999 | Peyret et al. |
| 5,844,218 A | 12/1998 | Kawan et al. | | 5,924,080 A | 7/1999 | Johnson |
| 5,844,230 A | 12/1998 | Lalonde | | 5,924,624 A | 7/1999 | Martin |
| 5,845,267 A | 12/1998 | Ronen | | 5,928,788 A | 7/1999 | Riedl |
| 5,851,149 A | 12/1998 | Xidos et al. | | 5,929,801 A | 7/1999 | Aslanidis et al. |
| 5,852,812 A | 12/1998 | Reeder | | 5,930,767 A | 7/1999 | Reber et al. |
| 5,854,891 A | 12/1998 | Postlewaite et al. | | 5,930,777 A | 7/1999 | Barber |
| 5,856,048 A | 1/1999 | Tahara et al. | | 5,931,917 A | 8/1999 | Nguyen et al. |
| 5,857,079 A | 1/1999 | Claus et al. | | 5,932,870 A | 8/1999 | Berson |
| 5,857,152 A | 1/1999 | Everett | | 5,933,328 A | 8/1999 | Wallace et al. |
| 5,857,709 A | 1/1999 | Chock | | 5,933,624 A | 8/1999 | Balmer |
| 5,858,006 A | 1/1999 | Van der AA et al. | | 5,936,226 A | 8/1999 | Aucsmith |
| 5,859,419 A | 1/1999 | Wynn | | 5,936,227 A | 8/1999 | Truggelmann et al. |
| 5,859,587 A | 1/1999 | Alicot et al. | | 5,938,010 A | 8/1999 | Osterbye |
| 5,859,779 A | 1/1999 | Giordano et al. | | 5,942,761 A | 8/1999 | Tuli |
| 5,862,325 A | 1/1999 | Reed et al. | | 5,943,624 A | 8/1999 | Fox et al. |
| 5,864,306 A | 1/1999 | Dwyer et al. | | 5,945,653 A * | 8/1999 | Walker et al. .............. 235/380 |
| 5,864,323 A | 1/1999 | Berthon | | 5,948,116 A | 9/1999 | Aslanidis et al. |
| 5,864,830 A | 1/1999 | Armetta et al. | | 5,949,044 A | 9/1999 | Walker et al. |
| 5,865,470 A | 2/1999 | Thompson | | 5,949,335 A | 9/1999 | Maynard |
| 5,867,100 A | 2/1999 | dHont | | 5,949,876 A | 9/1999 | Ginter et al. |
| 5,869,822 A * | 2/1999 | Meadows et al. .......... 235/380 | | 5,950,174 A | 9/1999 | Brendzel |
| 5,870,031 A | 2/1999 | Kaiser et al. | | 5,950,179 A | 9/1999 | Buchanan |
| 5,870,915 A | 2/1999 | dHont | | 5,953,512 A | 9/1999 | Cai et al. |
| 5,875,432 A | 2/1999 | Sehr | | 5,953,710 A | 9/1999 | Fleming |
| D406,861 S | 3/1999 | Leedy, Jr. | | 5,955,717 A | 9/1999 | Vanstone |
| 5,878,138 A | 3/1999 | Yacobi | | 5,955,951 A | 9/1999 | Wischerop et al. |
| 5,878,141 A | 3/1999 | Daly et al. | | 5,955,969 A | 9/1999 | dHont |
| 5,878,215 A | 3/1999 | Kling et al. | | 5,956,024 A | 9/1999 | Strickland et al. |
| 5,878,337 A | 3/1999 | Joao et al. | | 5,956,693 A | 9/1999 | Geerlings |
| 5,878,403 A | 3/1999 | DeFrancesco et al. | | 5,956,699 A | 9/1999 | Wong et al. |
| 5,880,675 A | 3/1999 | Trautner | | 5,958,004 A | 9/1999 | Helland et al. |
| 5,881,272 A | 3/1999 | Balmer | | 5,960,411 A | 9/1999 | Hartman et al. |
| 5,883,377 A | 3/1999 | Chapin, Jr. | | 5,960,416 A | 9/1999 | Block |
| 5,883,810 A | 3/1999 | Franklin et al. | | 5,963,915 A | 10/1999 | Kirsch |
| 5,884,271 A | 3/1999 | Pitroda | | 5,963,924 A | 10/1999 | Williams et al. |
| 5,884,280 A | 3/1999 | Yoshioka et al. | | 5,966,697 A | 10/1999 | Fergerson et al. |
| 5,884,292 A | 3/1999 | Baker et al. | | 5,968,570 A | 10/1999 | Paulucci |
| 5,884,310 A | 3/1999 | Brichta et al. | | 5,969,318 A | 10/1999 | Mackenthun |
| 5,886,333 A | 3/1999 | Miyake | | 5,970,148 A | 10/1999 | Meier |
| 5,887,266 A | 3/1999 | Heinonen et al. | | 5,970,470 A | 10/1999 | Walker |
| 5,889,941 A | 3/1999 | Tushie et al. | | 5,970,471 A | 10/1999 | Hill |
| 5,890,137 A | 3/1999 | Koreeda | | 5,970,472 A | 10/1999 | Allsop et al. |
| D408,054 S | 4/1999 | Leedy, Jr. | | 5,970,473 A | 10/1999 | Gerszberg et al. |
| 5,892,211 A | 4/1999 | Davis et al. | | 5,970,475 A | 10/1999 | Barnes et al. |
| 5,897,622 A | 4/1999 | Blinn et al. | | 5,971,276 A | 10/1999 | Sano et al. |
| 5,898,783 A | 4/1999 | Rohrbach | | 5,973,475 A | 10/1999 | Combaluzier |
| 5,898,838 A | 4/1999 | Wagner | | 5,974,238 A | 10/1999 | Chase, Jr. |
| 5,900,954 A | 5/1999 | Katz et al. | | RE36,365 E | 11/1999 | Levine et al. |
| 5,901,239 A | 5/1999 | Kamei | | 5,978,348 A | 11/1999 | Tamura |
| 5,903,830 A | 5/1999 | Joao et al. | | 5,978,840 A | 11/1999 | Nguyen et al. |
| 5,903,875 A | 5/1999 | Kohara | | 5,979,757 A | 11/1999 | Tracy et al. |
| 5,903,880 A | 5/1999 | Biffar | | 5,979,942 A | 11/1999 | Ivicic |
| 5,905,798 A | 5/1999 | Nerlikar et al. | | 5,982,293 A | 11/1999 | Everett et al. |
| 5,905,908 A | 5/1999 | Wagner | | 5,983,200 A | 11/1999 | Slotznick |
| 5,907,620 A | 5/1999 | Klemba et al. | | 5,983,207 A | 11/1999 | Turk et al. |
| 5,909,492 A | 6/1999 | Payne et al. | | 5,983,208 A | 11/1999 | Haller |
| 5,912,446 A | 6/1999 | Wong et al. | | 5,984,180 A | 11/1999 | Albrecht |
| 5,912,678 A | 6/1999 | Saxena et al. | | 5,987,140 A | 11/1999 | Rowney et al. |
| 5,913,203 A | 6/1999 | Wong et al. | | 5,987,155 A | 11/1999 | Dunn et al. |
| 5,914,472 A | 6/1999 | Foladare et al. | | 5,987,498 A | 11/1999 | Athing et al. |
| 5,915,016 A | 6/1999 | Savalle et al. | | 5,988,497 A | 11/1999 | Wallace |
| 5,915,023 A | 6/1999 | Bernstein | | 5,988,510 A | 11/1999 | Tuttle |
| 5,915,973 A | 6/1999 | Hoehn-Saric et al. | | 5,989,950 A | 11/1999 | Wu |
| 5,917,168 A | 6/1999 | Nakamura et al. | | 5,991,413 A | 11/1999 | Arditti et al. |

| | | | | | | |
|---|---|---|---|---|---|---|
| 5,991,608 | A | 11/1999 | Leyten | 6,088,717 A | 7/2000 | Reed et al. |
| 5,991,748 | A | 11/1999 | Taskett | 6,088,797 A | 7/2000 | Rosen |
| 5,991,750 | A | 11/1999 | Watson | 6,091,835 A | 7/2000 | Smithies et al. |
| 5,995,014 | A | 11/1999 | DiMaria | 6,092,057 A | 7/2000 | Zimmerman et al. |
| 5,996,076 | A | 11/1999 | Rowney et al. | 6,092,198 A | 7/2000 | Lanzy et al. |
| 5,999,914 | A | 12/1999 | Blinn et al. | 6,095,413 A | 8/2000 | Tetro et al. |
| 6,000,832 | A * | 12/1999 | Franklin et al. ............ 700/232 | 6,098,053 A | 8/2000 | Slater |
| 6,002,438 | A | 12/1999 | Hocevar et al. | 6,101,174 A | 8/2000 | Langston |
| 6,002,767 | A | 12/1999 | Kramer | 6,101,477 A * | 8/2000 | Hohle et al. .................. 705/1 |
| 6,003,014 | A | 12/1999 | Lee et al. | 6,102,162 A | 8/2000 | Teicher |
| 6,005,942 | A | 12/1999 | Chan et al. | 6,102,672 A | 8/2000 | Woollenweber |
| 6,006,216 | A | 12/1999 | Griffin et al. | 6,104,281 A | 8/2000 | Heinrich et al. |
| 6,006,988 | A | 12/1999 | Behrmann et al. | 6,104,311 A | 8/2000 | Lastinger |
| 6,009,412 | A | 12/1999 | Storey | 6,104,922 A | 8/2000 | Baumann |
| 6,011,487 | A | 1/2000 | Plocher | 6,105,008 A | 8/2000 | Davis et al. |
| 6,012,039 | A | 1/2000 | Hoffman et al. | 6,105,013 A | 8/2000 | Curry et al. |
| 6,012,049 | A | 1/2000 | Kawan | 6,105,865 A | 8/2000 | Hardesty |
| 6,012,143 | A | 1/2000 | Tanaka | 6,109,525 A | 8/2000 | Blomqvist et al. |
| 6,012,636 | A | 1/2000 | Smith | 6,112,152 A | 8/2000 | Tuttle |
| 6,014,634 | A | 1/2000 | Scroggie et al. | 6,112,191 A | 8/2000 | Burke |
| 6,014,635 | A * | 1/2000 | Harris et al. ............... 705/14 | 6,112,984 A | 9/2000 | Snavely |
| 6,014,636 | A | 1/2000 | Reeder | 6,115,360 A | 9/2000 | Quay et al. |
| 6,014,645 | A | 1/2000 | Cunningham | 6,115,458 A | 9/2000 | Taskett |
| 6,014,646 | A | 1/2000 | Vallee et al. | 6,116,423 A | 9/2000 | Troxtell, Jr. et al. |
| 6,014,648 | A | 1/2000 | Brennan | 6,116,505 A | 9/2000 | Withrow |
| 6,014,650 | A | 1/2000 | Zampese | 6,116,655 A | 9/2000 | Thouin et al. |
| 6,014,748 | A | 1/2000 | Tushi et al. | 6,116,736 A | 9/2000 | Stark et al. |
| 6,016,476 | A | 1/2000 | Maes et al. | 6,118,189 A | 9/2000 | Flaxl |
| 6,016,482 | A | 1/2000 | Molinari et al. | 6,120,461 A | 9/2000 | Smyth |
| 6,016,484 | A | 1/2000 | Williams et al. | 6,121,544 A | 9/2000 | Petsinger |
| 6,018,717 | A | 1/2000 | Lee et al. | 6,122,625 A | 9/2000 | Rosen |
| 6,018,718 | A | 1/2000 | Walker et al. | 6,123,223 A | 9/2000 | Watkins |
| RE36,580 | E | 2/2000 | Bogosian, Jr. | 6,125,352 A | 9/2000 | Franklin et al. |
| 6,023,510 | A | 2/2000 | Epstein | D432,939 S | 10/2000 | Hooglander |
| 6,024,286 | A | 2/2000 | Bradley et al. | 6,129,274 A | 10/2000 | Suzuki |
| 6,024,385 | A | 2/2000 | Goda | 6,133,834 A | 10/2000 | Eberth et al. |
| 6,025,283 | A | 2/2000 | Roberts | 6,141,651 A | 10/2000 | Riley et al. |
| 6,027,028 | A | 2/2000 | Pieterse et al. | 6,141,752 A | 10/2000 | Dancs et al. |
| 6,029,147 | A | 2/2000 | Horadan et al. | 6,148,093 A | 11/2000 | McConnell et al. |
| 6,029,149 | A | 2/2000 | Dykstra et al. | 6,148,484 A | 11/2000 | Andreae, Jr. |
| 6,029,150 | A | 2/2000 | Kravitz | 6,154,879 A | 11/2000 | Pare et al. |
| 6,029,890 | A | 2/2000 | Austin | 6,155,168 A | 12/2000 | Sakamoto |
| 6,032,866 | A | 3/2000 | Knighton et al. | 6,167,236 A | 12/2000 | Kaiser et al. |
| 6,038,551 | A | 3/2000 | Barlow et al. | 6,171,138 B1 | 1/2001 | Lefebvre et al. |
| 6,038,584 | A | 3/2000 | Balmer | 6,173,272 B1 | 1/2001 | Thomas et al. |
| 6,041,308 | A | 3/2000 | Walker et al. | 6,177,860 B1 | 1/2001 | Cromer et al. |
| 6,041,410 | A | 3/2000 | Hsu et al. | 6,179,205 B1 | 1/2001 | Sloan |
| 6,041,412 | A | 3/2000 | Timson et al. | 6,179,206 B1 | 1/2001 | Matsumori |
| 6,044,388 | A | 3/2000 | DeBellis et al. | 6,181,287 B1 | 1/2001 | Beigel |
| 6,047,888 | A | 4/2000 | Dethloff | 6,182,895 B1 | 2/2001 | Albrecht |
| 6,050,605 | A | 4/2000 | Mikelionis et al. | 6,184,788 B1 | 2/2001 | Middlemiss et al. |
| 6,052,675 | A | 4/2000 | Checchio | 6,188,994 B1 | 2/2001 | Egendorf |
| 6,058,418 | A | 5/2000 | Kobata | 6,189,779 B1 | 2/2001 | Verdicchio et al. |
| 6,060,815 | A | 5/2000 | Nysen | 6,192,255 B1 | 2/2001 | Lewis et al. |
| 6,061,789 | A | 5/2000 | Hauser et al. | 6,196,465 B1 | 3/2001 | Awano |
| 6,064,320 | A | 5/2000 | dHont et al. | 6,197,396 B1 | 3/2001 | Haas et al. |
| 6,064,751 | A | 5/2000 | Smithies et al. | 6,198,728 B1 | 3/2001 | Hulyalkar et al. |
| 6,064,981 | A | 5/2000 | Barni et al. | 6,198,762 B1 | 3/2001 | Krasnov |
| 6,070,003 | A | 5/2000 | Gove et al. | 6,198,875 B1 | 3/2001 | Edenson et al. |
| 6,070,150 | A | 5/2000 | Remington et al. | 6,199,079 B1 | 3/2001 | Gupta et al. |
| 6,070,154 | A | 5/2000 | Tavor et al. | 6,199,762 B1 | 3/2001 | Hohle |
| 6,072,870 | A | 6/2000 | Nguyen et al. | 6,200,272 B1 | 3/2001 | Linden |
| 6,073,236 | A | 6/2000 | Kusakabe et al. | 6,202,927 B1 | 3/2001 | Bashan et al. |
| 6,073,840 | A | 6/2000 | Marion | 6,205,151 B1 | 3/2001 | Quay et al. |
| 6,076,078 | A | 6/2000 | Camp et al. | 6,206,293 B1 | 3/2001 | Gutman et al. |
| 6,078,888 | A | 6/2000 | Johnson, Jr. | 6,215,437 B1 | 4/2001 | Schurmann et al. |
| 6,078,906 | A | 6/2000 | Huberman | 6,216,219 B1 | 4/2001 | Cai et al. |
| 6,081,790 | A | 6/2000 | Rosen | 6,219,439 B1 | 4/2001 | Burger |
| RE36,788 | E | 7/2000 | Mansvelt et al. | 6,219,639 B1 | 4/2001 | Bakis et al. |
| 6,082,422 | A | 7/2000 | Kaminski | 6,222,914 B1 | 4/2001 | McMullin |
| 6,084,967 | A | 7/2000 | Kennedy et al. | D442,627 S | 5/2001 | Webb et al. |
| 6,086,971 | A | 7/2000 | Haas et al. | D442,629 S | 5/2001 | Webb et al. |
| 6,088,686 | A | 7/2000 | Walker et al. | 6,223,977 B1 | 5/2001 | Hill |

| | | |
|---|---|---|
| 6,223,984 B1 | 5/2001 | Renner et al. |
| 6,226,382 B1 | 5/2001 | MRaihi et al. |
| 6,227,424 B1 | 5/2001 | Roegner |
| 6,230,270 B1 | 5/2001 | Laczko, Sr. |
| 6,232,917 B1 | 5/2001 | Baumer et al. |
| 6,233,348 B1 | 5/2001 | Fujii et al. |
| 6,233,683 B1 | 5/2001 | Chan et al. |
| 6,237,848 B1 | 5/2001 | Everett |
| 6,239,675 B1 | 5/2001 | Flaxl |
| 6,240,187 B1 | 5/2001 | Lewis |
| 6,247,030 B1 | 6/2001 | Suzuki |
| 6,248,314 B1 | 6/2001 | Nakashimada et al. |
| 6,250,557 B1 | 6/2001 | Forslund et al. |
| 6,255,031 B1 | 7/2001 | Yao et al. |
| 6,257,486 B1 | 7/2001 | Teicher et al. |
| 6,257,620 B1 | 7/2001 | Kenney |
| 6,259,769 B1 | 7/2001 | Page |
| 6,260,026 B1 | 7/2001 | Tomida et al. |
| 6,260,088 B1 | 7/2001 | Gove et al. |
| 6,263,316 B1 | 7/2001 | Khan et al. |
| 6,263,446 B1 | 7/2001 | Kausik et al. |
| 6,264,106 B1 | 7/2001 | Bridgelall |
| 6,265,977 B1 | 7/2001 | Vega et al. |
| 6,266,754 B1 | 7/2001 | Laczko, Sr. et al. |
| 6,267,292 B1 | 7/2001 | Walker et al. |
| 6,268,788 B1 | 7/2001 | Gray |
| 6,269,348 B1 | 7/2001 | Pare, Jr. et al. |
| 6,273,335 B1 | 8/2001 | Sloan |
| 6,277,232 B1 | 8/2001 | Wang et al. |
| 6,282,522 B1 | 8/2001 | Davis et al. |
| D447,515 S | 9/2001 | Faenza, Jr. et al. |
| 6,286,763 B1 | 9/2001 | Reynolds et al. |
| 6,289,324 B1 | 9/2001 | Kawan |
| 6,290,137 B1 | 9/2001 | Kiekhaefer |
| 6,293,462 B1 | 9/2001 | Gangi |
| 6,295,522 B1 | 9/2001 | Boesch |
| 6,296,188 B1 | 10/2001 | Kiekhaefer |
| 6,297,727 B1 | 10/2001 | Nelson, Jr. |
| 6,304,223 B1 | 10/2001 | Hilton et al. |
| 6,307,956 B1 | 10/2001 | Black |
| 6,309,098 B1 | 10/2001 | Wong |
| 6,315,193 B1 | 11/2001 | Hogan |
| 6,315,195 B1 | 11/2001 | Ramachandran |
| 6,315,206 B1 | 11/2001 | Hansen et al. |
| 6,317,721 B1 * | 11/2001 | Hurta et al. ............... 705/13 |
| 6,317,750 B1 | 11/2001 | Tortolani et al. |
| 6,317,755 B1 | 11/2001 | Rakers et al. |
| 6,318,636 B1 | 11/2001 | Reynolds et al. |
| 6,323,566 B1 * | 11/2001 | Meier ................ 307/10.2 |
| 6,325,285 B1 | 12/2001 | Baratelli |
| 6,325,293 B1 | 12/2001 | Moreno |
| 6,326,934 B1 | 12/2001 | Kinzie |
| 6,327,573 B1 | 12/2001 | Walker et al. |
| 6,327,578 B1 | 12/2001 | Linehan |
| 6,329,920 B1 | 12/2001 | Morrison et al. |
| 6,330,544 B1 | 12/2001 | Walker et al. |
| 6,331,972 B1 | 12/2001 | Harris et al. |
| 6,332,134 B1 | 12/2001 | Foster |
| 6,332,193 B1 | 12/2001 | Glass et al. |
| D453,160 S | 1/2002 | Pentz et al. |
| D453,161 S | 1/2002 | Pentz |
| 6,336,095 B1 | 1/2002 | Rosen |
| 6,338,048 B1 | 1/2002 | Mori |
| 6,339,384 B1 | 1/2002 | Valdes-Rodriguez |
| 6,342,844 B1 | 1/2002 | Rozin |
| D453,337 S | 2/2002 | Pentz et al. |
| D453,338 S | 2/2002 | Pentz et al. |
| D453,516 S | 2/2002 | Pentz |
| D454,910 S | 3/2002 | Smith et al. |
| 6,353,420 B1 | 3/2002 | Chung |
| 6,353,811 B1 | 3/2002 | Weissman |
| 6,360,953 B1 | 3/2002 | Lin et al. |
| 6,364,208 B1 | 4/2002 | Stanford et al. |
| 6,367,011 B1 | 4/2002 | Lee et al. |
| 6,374,245 B1 | 4/2002 | Park |
| 6,377,034 B1 | 4/2002 | Ivanov |
| 6,378,073 B1 | 4/2002 | Davis et al. |
| D457,556 S | 5/2002 | Hochschild |
| 6,386,444 B1 | 5/2002 | Sullivan |
| 6,388,533 B2 | 5/2002 | Swoboda |
| 6,390,375 B2 | 5/2002 | Kayanakis |
| 6,397,198 B1 | 5/2002 | Hoffman et al. |
| 6,400,272 B1 | 6/2002 | Holtzman et al. |
| 6,402,026 B1 | 6/2002 | Schwier |
| 6,402,028 B1 | 6/2002 | Graham, Jr. et al. |
| 6,404,341 B1 | 6/2002 | Reid |
| 6,406,935 B2 | 6/2002 | Kayanakis et al. |
| 6,411,611 B1 | 6/2002 | van der Tuijn |
| D460,455 S | 7/2002 | Pentz |
| 6,415,978 B1 | 7/2002 | McAllister |
| 6,419,158 B2 | 7/2002 | Hooglander |
| 6,421,650 B1 | 7/2002 | Goetz et al. |
| 6,422,462 B1 | 7/2002 | Cohen |
| 6,422,464 B1 | 7/2002 | Terranova |
| 6,422,472 B1 | 7/2002 | Thevenot et al. |
| 6,424,029 B1 | 7/2002 | Giesler |
| 6,424,249 B1 | 7/2002 | Houvener |
| RE37,822 E | 8/2002 | Anthonyson |
| D461,477 S | 8/2002 | Pentz |
| 6,427,910 B1 | 8/2002 | Barnes et al. |
| 6,434,159 B1 * | 8/2002 | Woodward et al. .......... 370/401 |
| 6,435,415 B1 | 8/2002 | Catte |
| 6,438,235 B2 | 8/2002 | Sims, III |
| 6,439,455 B1 | 8/2002 | Everett et al. |
| 6,442,532 B1 | 8/2002 | Kawan |
| D462,965 S | 9/2002 | Pentz |
| D462,966 S | 9/2002 | Pentz et al. |
| 6,445,794 B1 | 9/2002 | Shefi |
| 6,446,862 B1 | 9/2002 | Mann |
| 6,457,000 B1 | 9/2002 | Witkowski et al. |
| 6,457,996 B1 | 10/2002 | Shih |
| 6,460,696 B1 | 10/2002 | Meyer |
| 6,466,804 B1 | 10/2002 | Pecen et al. |
| 6,471,127 B2 | 10/2002 | Pentz et al. |
| 6,473,500 B1 | 10/2002 | Risafi et al. |
| 6,480,100 B1 | 11/2002 | Frieden et al. |
| 6,480,101 B1 | 11/2002 | Kelly et al. |
| 6,480,825 B1 | 11/2002 | Sharma et al. |
| 6,480,869 B1 | 11/2002 | Fujioka |
| 6,481,621 B1 | 11/2002 | Herrendoerfer et al. |
| 6,481,623 B1 | 11/2002 | Grant et al. |
| 6,481,632 B2 | 11/2002 | Wentker et al. |
| 6,483,427 B1 | 11/2002 | Werb |
| 6,483,477 B1 | 11/2002 | Plonka |
| 6,483,929 B1 | 11/2002 | Murakami et al. |
| 6,484,937 B1 | 11/2002 | Devaux et al. |
| 6,490,443 B1 | 12/2002 | Freeny, Jr. |
| 6,491,229 B1 | 12/2002 | Berney |
| 6,491,639 B1 | 12/2002 | Turcott |
| 6,494,367 B1 | 12/2002 | Zacharias |
| 6,494,380 B2 | 12/2002 | Jarosz |
| 6,496,594 B1 | 12/2002 | Prokoski |
| 6,501,832 B1 | 12/2002 | Saylor et al. |
| 6,505,772 B1 | 1/2003 | Mollett et al. |
| 6,507,662 B1 | 1/2003 | Brooks |
| 6,507,762 B1 | 1/2003 | Amro et al. |
| 6,510,983 B2 | 1/2003 | Horowitz et al. |
| 6,510,998 B1 | 1/2003 | Stanford et al. |
| 6,513,015 B2 | 1/2003 | Ogasawara |
| 6,519,565 B1 | 2/2003 | Clements et al. |
| 6,520,542 B2 | 2/2003 | Thompson et al. |
| 6,523,292 B2 | 2/2003 | Slavik |
| 6,529,880 B1 | 3/2003 | McKeen et al. |
| 6,535,726 B1 | 3/2003 | Johnson |
| 6,539,101 B1 | 3/2003 | Black |
| 6,546,373 B1 | 4/2003 | Cerra |

| | | |
|---|---|---|
| 6,547,133 B1 | 4/2003 | DeVries, Jr. et al. |
| 6,549,912 B1 | 4/2003 | Chen |
| D474,234 S | 5/2003 | Nelms et al. |
| 6,560,581 B1 | 5/2003 | Fox et al. |
| 6,575,361 B1 | 6/2003 | Graves et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,587,835 B1 | 7/2003 | Treyz et al. |
| 6,588,660 B1 | 7/2003 | Buescher et al. |
| 6,588,673 B1 | 7/2003 | Chan et al. |
| 6,589,119 B1 | 7/2003 | Orus et al. |
| 6,591,249 B2 | 7/2003 | Zoka |
| 6,598,024 B1 | 7/2003 | Walker et al. |
| 6,601,622 B1 | 8/2003 | Young |
| 6,601,759 B2 | 8/2003 | Fife et al. |
| 6,601,762 B2 | 8/2003 | Piotrowski |
| 6,608,551 B1 * | 8/2003 | Anderson et al. ........ 340/10.51 |
| 6,608,995 B1 | 8/2003 | Kawasaki et al. |
| 6,609,655 B1 | 8/2003 | Harrell |
| 6,609,656 B1 | 8/2003 | Elledge |
| 6,609,658 B1 | 8/2003 | Sehr |
| 6,623,039 B2 | 9/2003 | Thompson et al. |
| 6,626,356 B2 | 9/2003 | Davenport et al. |
| 6,628,961 B1 | 9/2003 | Ho et al. |
| 6,629,591 B1 | 10/2003 | Griswold et al. |
| 6,631,849 B2 | 10/2003 | Blossom |
| 6,636,620 B1 | 10/2003 | Hoshino |
| 6,636,833 B1 | 10/2003 | Flitcroft et al. |
| 6,644,551 B2 | 11/2003 | Clayman et al. |
| 6,650,887 B2 | 11/2003 | McGregor et al. |
| 6,651,168 B1 | 11/2003 | Kao et al. |
| 6,651,813 B2 | 11/2003 | Vallans et al. |
| 6,651,892 B2 | 11/2003 | Hooglander |
| 6,657,614 B1 | 12/2003 | Ito et al. |
| 6,662,166 B2 | 12/2003 | Pare, Jr. et al. |
| 6,665,405 B1 | 12/2003 | Lenstra |
| 6,669,086 B2 | 12/2003 | Abdi et al. |
| 6,671,358 B1 | 12/2003 | Sossaman et al. |
| 6,674,786 B1 | 1/2004 | Nakamura et al. |
| 6,679,427 B1 | 1/2004 | Kuroiwa |
| 6,681,328 B1 | 1/2004 | Harris et al. |
| 6,681,926 B2 | 1/2004 | De Volpi |
| 6,684,269 B2 | 1/2004 | Wagner |
| 6,685,089 B2 | 2/2004 | Terranova et al. |
| 6,686,847 B1 | 2/2004 | Mittler |
| 6,687,714 B1 | 2/2004 | Kogen et al. |
| 6,687,875 B1 | 2/2004 | Suzuki |
| 6,690,930 B1 | 2/2004 | Dupre |
| 6,693,513 B2 | 2/2004 | Tuttle |
| 6,697,947 B1 | 2/2004 | Matyas, Jr. et al. |
| 6,703,918 B1 | 3/2004 | Kita |
| 6,704,039 B2 | 3/2004 | Pena |
| 6,704,608 B1 | 3/2004 | Azuma |
| 6,705,530 B2 | 3/2004 | Kiekhaefer |
| 6,708,375 B1 | 3/2004 | Johnson |
| 6,711,262 B1 | 3/2004 | Watanen |
| 6,725,202 B1 * | 4/2004 | Hurta et al. .................... 705/13 |
| 6,732,919 B2 | 5/2004 | Macklin et al. |
| 6,732,936 B1 | 5/2004 | Kiekhaefer |
| 6,735,081 B1 | 5/2004 | Bishop et al. |
| 6,742,120 B1 | 5/2004 | Markakis et al. |
| 6,747,546 B1 | 6/2004 | Hikita et al. |
| 6,751,805 B1 | 6/2004 | Austion |
| 6,760,581 B2 | 7/2004 | Dutta |
| 6,763,500 B2 | 7/2004 | Black et al. |
| 6,765,470 B2 | 7/2004 | Shinzaki |
| 6,766,952 B2 | 7/2004 | Luu |
| 6,771,981 B1 | 8/2004 | Zalewski et al. |
| 6,786,400 B1 | 9/2004 | Bucci |
| 6,789,012 B1 | 9/2004 | Childs et al. |
| 6,799,726 B2 | 10/2004 | Stockhammer |
| 6,816,058 B2 | 11/2004 | McGregor et al. |
| 6,819,219 B1 | 11/2004 | Bolle et al. |
| 6,823,910 B1 | 11/2004 | Elnekaveh |
| 6,834,270 B1 | 12/2004 | Pagani et al. |
| 6,834,795 B1 | 12/2004 | Rasmussen et al. |
| 6,843,415 B2 | 1/2005 | Vogler |
| 6,845,863 B1 | 1/2005 | Riley |
| 6,853,987 B1 | 2/2005 | Cook |
| 6,873,974 B1 | 3/2005 | Schutzer |
| 6,877,097 B2 | 4/2005 | Hamid et al. |
| 6,883,715 B1 | 4/2005 | Fruhauf et al. |
| 6,898,299 B1 | 5/2005 | Brooks |
| H2120 H | 7/2005 | Cudlitz |
| 6,914,517 B2 | 7/2005 | Kinsella |
| 6,915,277 B1 | 7/2005 | Manchester et al. |
| 6,920,560 B2 | 7/2005 | Wallace |
| 6,925,439 B1 | 8/2005 | Pitroda |
| 6,928,181 B2 | 8/2005 | Brooks |
| 6,931,538 B1 | 8/2005 | Sawaguchi |
| 6,934,861 B2 | 8/2005 | Haala |
| 6,940,461 B2 | 9/2005 | Nantz et al. |
| 6,944,402 B1 | 9/2005 | Baker et al. |
| 6,944,768 B2 | 9/2005 | Siegel et al. |
| 6,959,874 B2 | 11/2005 | Bardwell |
| 6,961,448 B2 | 11/2005 | Nichols et al. |
| 6,970,583 B2 | 11/2005 | Black |
| 6,978,369 B2 | 12/2005 | Wheeler et al. |
| 6,986,099 B2 | 1/2006 | Todd |
| 6,990,480 B1 | 1/2006 | Burt |
| 7,003,497 B2 | 2/2006 | Maes |
| 7,003,501 B2 | 2/2006 | Ostroff |
| 7,006,993 B1 | 2/2006 | Cheong et al. |
| 7,049,962 B2 | 5/2006 | Atherton et al. |
| 7,051,925 B2 | 5/2006 | Schwarz, Jr. |
| 7,059,159 B2 | 6/2006 | Lanigan et al. |
| 7,068,148 B2 | 6/2006 | Shanks et al. |
| 7,096,204 B1 | 8/2006 | Chen et al. |
| 7,096,494 B1 | 8/2006 | Chen |
| 7,100,821 B2 | 9/2006 | Rasti |
| 7,102,523 B2 | 9/2006 | Shanks et al. |
| 7,108,190 B2 | 9/2006 | Burgan et al. |
| 7,127,672 B1 | 10/2006 | Patterson et al. |
| 7,131,574 B1 | 11/2006 | Sciupac et al. |
| 7,132,946 B2 | 11/2006 | Waldner et al. |
| 7,136,835 B1 | 11/2006 | Flitcroft et al. |
| 7,150,407 B1 | 12/2006 | Berger et al. |
| 7,154,375 B2 | 12/2006 | Beenau et al. |
| 7,171,662 B1 | 1/2007 | Misra et al. |
| 7,184,747 B2 | 2/2007 | Bogat |
| 7,213,748 B2 | 5/2007 | Tsuei et al. |
| 7,237,121 B2 | 6/2007 | Cammack et al. |
| 7,239,226 B2 | 7/2007 | Berardi et al. |
| 7,254,557 B1 | 8/2007 | Gillin et al. |
| 7,281,135 B2 | 10/2007 | Black |
| 7,287,271 B1 | 10/2007 | Riggins |
| 7,299,364 B2 | 11/2007 | Noble et al. |
| 7,303,120 B2 | 12/2007 | Beenau et al. |
| 7,314,164 B2 | 1/2008 | Bonalle et al. |
| 7,314,165 B2 | 1/2008 | Bonalle et al. |
| 7,318,550 B2 | 1/2008 | Bonalle et al. |
| 7,325,724 B2 | 2/2008 | Bonalle et al. |
| 7,341,181 B2 | 3/2008 | Bonalle et al. |
| 7,363,504 B2 | 4/2008 | Bonalle et al. |
| 7,363,505 B2 | 4/2008 | Black |
| 7,419,093 B1 * | 9/2008 | Blackson et al. ............ 235/379 |
| 2001/0003071 A1 | 6/2001 | Mansutti et al. |
| 2001/0013542 A1 | 8/2001 | Horowitz et al. |
| 2001/0013546 A1 | 8/2001 | Ross |
| 2001/0013551 A1 | 8/2001 | Ramachandran |
| 2001/0017584 A1 | 8/2001 | Shinzaki |
| 2001/0018660 A1 | 8/2001 | Sehr |
| 2001/0022446 A1 | 9/2001 | Klure |
| 2001/0024157 A1 | 9/2001 | Hansmann et al. |
| 2001/0029493 A1 | 10/2001 | Pare et al. |

| | | | | | | |
|---|---|---|---|---|---|---|
| 2001/0032192 A1 | 10/2001 | Putta et al. | | 2002/0133725 A1 | 9/2002 | Roy et al. |
| 2001/0034565 A1 | 10/2001 | Leatherman | | 2002/0138351 A1 | 9/2002 | Houvener et al. |
| 2001/0034720 A1 | 10/2001 | Armes | | 2002/0138438 A1 | 9/2002 | Bardwell |
| 2001/0036301 A1 | 11/2001 | Yamaguchi et al. | | 2002/0139839 A1 | 10/2002 | Catan |
| 2001/0036835 A1 | 11/2001 | Leedom, Jr. | | 2002/0140542 A1 | 10/2002 | Prokoski et al. |
| 2001/0039617 A1 | 11/2001 | Buhrlen et al. | | 2002/0145043 A1 | 10/2002 | Challa et al. |
| 2001/0040507 A1 | 11/2001 | Eckstein et al. | | 2002/0147002 A1 | 10/2002 | Trop et al. |
| 2001/0045469 A1 | 11/2001 | Hooglander | | 2002/0147600 A1 | 10/2002 | Waters et al. |
| 2001/0049628 A1 | 12/2001 | Icho | | 2002/0147913 A1 | 10/2002 | Lun Yip |
| 2001/0053239 A1 | 12/2001 | Takhar | | 2002/0148892 A1 | 10/2002 | Bardwell |
| 2001/0055411 A1 | 12/2001 | Black | | 2002/0149467 A1 | 10/2002 | Calvesio et al. |
| 2002/0002468 A1 | 1/2002 | Spagna et al. | | 2002/0152123 A1 | 10/2002 | Giordano et al. |
| 2002/0005774 A1 | 1/2002 | Rudolph et al. | | 2002/0153410 A1 | 10/2002 | Santini |
| 2002/0011519 A1 | 1/2002 | Shults | | 2002/0153424 A1 | 10/2002 | Li |
| 2002/0014529 A1 | 2/2002 | Tanaka | | 2002/0154795 A1 | 10/2002 | Lee et al. |
| 2002/0014952 A1 | 2/2002 | Terranova | | 2002/0158747 A1 | 10/2002 | McGregor et al. |
| 2002/0016687 A1 | 2/2002 | Felsenstein et al. | | 2002/0163421 A1 | 11/2002 | Wang et al. |
| 2002/0024590 A1 | 2/2002 | Pena | | 2002/0166891 A1 | 11/2002 | Stoutenburg et al. |
| 2002/0026419 A1 | 2/2002 | Maritzen et al. | | 2002/0166897 A1 | 11/2002 | Hooglander |
| 2002/0026575 A1 | 2/2002 | Wheeler et al. | | 2002/0169673 A1 | 11/2002 | Prorock et al. |
| 2002/0028704 A1 | 3/2002 | Bloomfield et al. | | 2002/0174067 A1 | 11/2002 | Hoffman et al. |
| 2002/0030579 A1 | 3/2002 | Albert et al. | | 2002/0175805 A9 | 11/2002 | Armstrong et al. |
| 2002/0030581 A1 | 3/2002 | Janiak et al. | | 2002/0176522 A1 | 11/2002 | Fan |
| 2002/0035548 A1 | 3/2002 | Hogan et al. | | 2002/0178063 A1 | 11/2002 | Gravelle et al. |
| 2002/0036237 A1 | 3/2002 | Atherton et al. | | 2002/0178124 A1 | 11/2002 | Lewis |
| 2002/0038818 A1 | 4/2002 | Zingher et al. | | 2002/0178369 A1 | 11/2002 | Black |
| 2002/0041093 A1 | 4/2002 | Cox et al. | | 2002/0179704 A1 | 12/2002 | Deaton |
| 2002/0042782 A1 | 4/2002 | Albazz et al. | | 2002/0185543 A1 | 12/2002 | Pentz et al. |
| 2002/0043566 A1 | 4/2002 | Goodman et al. | | 2002/0186133 A1 | 12/2002 | Loof |
| 2002/0046341 A1 | 4/2002 | Kazaks et al. | | 2002/0186838 A1 | 12/2002 | Brandys |
| 2002/0052839 A1 | 5/2002 | Takatori | | 2002/0188501 A1 | 12/2002 | Lefkowith |
| 2002/0062249 A1 | 5/2002 | Iannacci | | 2002/0188854 A1 | 12/2002 | Heaven et al. |
| 2002/0062284 A1 | 5/2002 | Kawan | | 2002/0188855 A1 | 12/2002 | Nakayama et al. |
| 2002/0062291 A1 | 5/2002 | Zoka | | 2002/0190124 A1 | 12/2002 | Piotrowski |
| 2002/0066784 A1 | 6/2002 | Segal et al. | | 2002/0190125 A1 | 12/2002 | Stockhammer |
| 2002/0072349 A1 | 6/2002 | Geiselman et al. | | 2002/0191816 A1 | 12/2002 | Maritzen et al. |
| 2002/0073025 A1 | 6/2002 | Tanner et al. | | 2002/0194137 A1 | 12/2002 | Park et al. |
| 2002/0074398 A1 | 6/2002 | Lancos et al. | | 2002/0194303 A1 | 12/2002 | Suila et al. |
| 2002/0077837 A1 | 6/2002 | Krueger et al. | | 2002/0194503 A1 | 12/2002 | Faith et al. |
| 2002/0077895 A1 | 6/2002 | Howell | | 2002/0196963 A1 | 12/2002 | Bardwell |
| 2002/0077992 A1 | 6/2002 | Tobin | | 2003/0001006 A1 | 1/2003 | Lee |
| 2002/0079367 A1 | 6/2002 | Montani | | 2003/0001755 A1 | 1/2003 | Tiernay et al. |
| 2002/0083320 A1 | 6/2002 | Vatanen | | 2003/0004866 A1 | 1/2003 | Huennekens et al. |
| 2002/0087869 A1 | 7/2002 | Kim | | 2003/0004881 A1 | 1/2003 | Shinzaki et al. |
| 2002/0092914 A1 | 7/2002 | Pentz et al. | | 2003/0005310 A1 | 1/2003 | Shinzaki |
| 2002/0095298 A1 | 7/2002 | Ewing | | 2003/0006901 A1 | 1/2003 | Kim et al. |
| 2002/0095343 A1 | 7/2002 | Barton et al. | | 2003/0009382 A1 | 1/2003 | DArbelott et al. |
| 2002/0095389 A1 | 7/2002 | Gaines | | 2003/0014307 A1 | 1/2003 | Heng |
| 2002/0095587 A1 | 7/2002 | Doyle et al. | | 2003/0014357 A1 | 1/2003 | Chrisekos et al. |
| 2002/0095588 A1 | 7/2002 | Shigematsu et al. | | 2003/0014891 A1 | 1/2003 | Nelms et al. |
| 2002/0097142 A1 | 7/2002 | Janiak et al. | | 2003/0018532 A1 | 1/2003 | Dudek et al. |
| 2002/0097144 A1 | 7/2002 | Collins et al. | | 2003/0018567 A1 | 1/2003 | Flitcroft et al. |
| 2002/0099665 A1 | 7/2002 | Burger et al. | | 2003/0018893 A1 | 1/2003 | Hess |
| 2002/0107007 A1 | 8/2002 | Gerson | | 2003/0025600 A1 | 2/2003 | Blanchard |
| 2002/0107742 A1 | 8/2002 | Magill | | 2003/0028481 A1 | 2/2003 | Flitcroft et al. |
| 2002/0107791 A1 | 8/2002 | Nobrega et al. | | 2003/0033697 A1 | 2/2003 | Hicks et al. |
| 2002/0108062 A1 | 8/2002 | Nakajima et al. | | 2003/0037264 A1 | 2/2003 | Ezaki et al. |
| 2002/0109580 A1 | 8/2002 | Shreve et al. | | 2003/0037851 A1 | 2/2003 | Hogganvik |
| 2002/0111210 A1 | 8/2002 | Luciano, Jr. et al. | | 2003/0046228 A1 | 3/2003 | Berney |
| 2002/0111917 A1 | 8/2002 | Hoffman et al. | | 2003/0046237 A1 | 3/2003 | Uberti |
| 2002/0111919 A1 | 8/2002 | Weller et al. | | 2003/0046540 A1 | 3/2003 | Nakamura et al. |
| 2002/0112177 A1 | 8/2002 | Voltmer et al. | | 2003/0047482 A1 | 3/2003 | Jones et al. |
| 2002/0113082 A1 | 8/2002 | Leatherman et al. | | 2003/0054836 A1 | 3/2003 | Michot |
| 2002/0116274 A1 | 8/2002 | Hind et al. | | 2003/0055727 A1 | 3/2003 | Walker et al. |
| 2002/0120584 A1 | 8/2002 | Hogan et al. | | 2003/0057226 A1 | 3/2003 | Long |
| 2002/0125164 A1 | 9/2002 | Bassinson | | 2003/0057278 A1 | 3/2003 | Wong |
| 2002/0126010 A1 | 9/2002 | Trimble et al. | | 2003/0061172 A1 | 3/2003 | Robinson |
| 2002/0128977 A1 | 9/2002 | Nambiar et al. | | 2003/0069828 A1 | 4/2003 | Blazey et al. |
| 2002/0129248 A1 | 9/2002 | Wheeler et al. | | 2003/0069846 A1 | 4/2003 | Marcon |
| 2002/0130186 A1 | 9/2002 | Lasch et al. | | 2003/0074317 A1 | 4/2003 | Hofi |
| 2002/0130187 A1 | 9/2002 | Berg et al. | | 2003/0086591 A1 | 5/2003 | Simon |
| 2002/0131567 A1 | 9/2002 | Maginas | | 2003/0093187 A1 | 5/2003 | Walker |
| 2002/0133467 A1 | 9/2002 | Hobson et al. | | 2003/0097344 A1 | 5/2003 | Chaum et al. |

| | | | | | |
|---|---|---|---|---|---|
| 2003/0106935 A1 | 6/2003 | Burchette, Jr. | 2004/0061593 A1 | 4/2004 | Lane |
| 2003/0112120 A1 | 6/2003 | K. | 2004/0062423 A1 | 4/2004 | Doi |
| 2003/0112972 A1 | 6/2003 | Hattick et al. | 2004/0073792 A1 | 4/2004 | Noble et al. |
| 2003/0115126 A1 | 6/2003 | Pitroda | 2004/0083184 A1 | 4/2004 | Tsuei et al. |
| 2003/0120554 A1 | 6/2003 | Hogan et al. | 2004/0083380 A1 | 4/2004 | Janke |
| 2003/0120626 A1 | 6/2003 | Piotrowski | 2004/0084524 A1 | 5/2004 | Ramachandran |
| 2003/0121969 A1 | 7/2003 | Wankmueller | 2004/0084542 A1 | 5/2004 | DeYoe et al. |
| 2003/0124294 A1 | 7/2003 | Hodson et al. | 2004/0089724 A1 | 5/2004 | Lasch et al. |
| 2003/0130820 A1 | 7/2003 | Lane, III | 2004/0098336 A1 | 5/2004 | Flink |
| 2003/0132132 A1 | 7/2003 | Small | 2004/0104266 A1 | 6/2004 | Bolle et al. |
| 2003/0132284 A1 | 7/2003 | Reynolds et al. | 2004/0104268 A1 | 6/2004 | Bailey et al. |
| 2003/0140228 A1 | 7/2003 | Binder | 2004/0118930 A1 | 6/2004 | Berardi et al. |
| 2003/0153356 A1 | 8/2003 | Liu | 2004/0124104 A1 | 7/2004 | DeVolpi |
| 2003/0160074 A1 | 8/2003 | Pineda | 2004/0124246 A1 | 7/2004 | Allen et al. |
| 2003/0163699 A1 | 8/2003 | Pailles et al. | 2004/0127256 A1 | 7/2004 | Goldthwaite et al. |
| 2003/0167207 A1 | 9/2003 | Berardi et al. | 2004/0129787 A1 | 7/2004 | Saito et al. |
| 2003/0173408 A1 | 9/2003 | Mosher, Jr. et al. | 2004/0131237 A1 | 7/2004 | Machida |
| 2003/0177102 A1 | 9/2003 | Robinson | 2004/0133787 A1 | 7/2004 | Doughty et al. |
| 2003/0177347 A1 | 9/2003 | Schneier et al. | 2004/0136573 A1 | 7/2004 | Sato |
| 2003/0178495 A1 | 9/2003 | Jones et al. | 2004/0139021 A1 | 7/2004 | Reed et al. |
| 2003/0183689 A1 | 10/2003 | Swift et al. | 2004/0144841 A1 | 7/2004 | Tsukamoto et al. |
| 2003/0183695 A1 | 10/2003 | Labrec et al. | 2004/0144846 A1 | 7/2004 | Lasch et al. |
| 2003/0183699 A1 | 10/2003 | Masui | 2004/0149820 A1 | 8/2004 | Zuili |
| 2003/0187786 A1 | 10/2003 | Swift et al. | 2004/0155101 A1 | 8/2004 | Royer et al. |
| 2003/0187787 A1 | 10/2003 | Freund | 2004/0158723 A1 | 8/2004 | Root |
| 2003/0187790 A1 | 10/2003 | Swift et al. | 2004/0160310 A1 | 8/2004 | Chen et al. |
| 2003/0187796 A1 | 10/2003 | Swift et al. | 2004/0161135 A1 | 8/2004 | Sano et al. |
| 2003/0191949 A1 | 10/2003 | Odagawa | 2004/0165753 A1 | 8/2004 | Takhiri et al. |
| 2003/0195037 A1 | 10/2003 | Vuong et al. | 2004/0169071 A1 | 9/2004 | Burgan et al. |
| 2003/0195842 A1 | 10/2003 | Reece | 2004/0172541 A1 | 9/2004 | Ando et al. |
| 2003/0195843 A1 | 10/2003 | Matsuda et al. | 2004/0176071 A1 | 9/2004 | Gehrmann et al. |
| 2003/0197593 A1 | 10/2003 | Siegel et al. | 2004/0177045 A1 | 9/2004 | Brown |
| 2003/0200184 A1 | 10/2003 | Dominguez et al. | 2004/0178063 A1 | 9/2004 | Mirchi et al. |
| 2003/0208439 A1 | 11/2003 | Rast | 2004/0180657 A1 | 9/2004 | Yaqub et al. |
| 2003/0218066 A1 | 11/2003 | Fernandes et al. | 2004/0188519 A1 | 9/2004 | Cassone |
| 2003/0220876 A1 | 11/2003 | Burger et al. | 2004/0190757 A1 | 9/2004 | Murphy et al. |
| 2003/0222153 A1 | 12/2003 | Pentz et al. | 2004/0193676 A1 | 9/2004 | Marks |
| 2003/0223625 A1 | 12/2003 | Hillhouse et al. | 2004/0195314 A1 | 10/2004 | Lee |
| 2003/0225623 A1 | 12/2003 | Wankmueller | 2004/0199469 A1 | 10/2004 | Barillova et al. |
| 2003/0225713 A1 | 12/2003 | Atkinson et al. | 2004/0202354 A1 | 10/2004 | Togino |
| 2003/0226041 A1 | 12/2003 | Palmer et al. | 2004/0208343 A1 | 10/2004 | Golden et al. |
| 2003/0227550 A1 | 12/2003 | Manico et al. | 2004/0215575 A1 | 10/2004 | Garrity |
| 2003/0229793 A1 | 12/2003 | McCall et al. | 2004/0222803 A1 | 11/2004 | Tartagni |
| 2003/0230514 A1 | 12/2003 | Baker | 2004/0230488 A1 | 11/2004 | Beenau et al. |
| 2003/0233334 A1 | 12/2003 | Smith | 2004/0232220 A1 | 11/2004 | Beenau et al. |
| 2003/0236704 A1 | 12/2003 | Antonucci | 2004/0232224 A1 | 11/2004 | Beenau et al. |
| 2004/0006497 A1 | 1/2004 | Nestor et al. | 2004/0233039 A1 | 11/2004 | Beenau et al. |
| 2004/0006539 A1 | 1/2004 | Royer et al. | 2004/0235450 A1 | 11/2004 | Rosenberg |
| 2004/0010462 A1 | 1/2004 | Moon et al. | 2004/0236680 A1 | 11/2004 | Luoffo et al. |
| 2004/0011877 A1 | 1/2004 | Reppermund | 2004/0236699 A1 | 11/2004 | Beenau et al. |
| 2004/0014457 A1 | 1/2004 | Stevens | 2004/0236700 A1 | 11/2004 | Beenau et al. |
| 2004/0015451 A1 | 1/2004 | Sahota et al. | 2004/0236701 A1 | 11/2004 | Beenau et al. |
| 2004/0016796 A1 | 1/2004 | Hanna et al. | 2004/0236819 A1 | 11/2004 | Anati et al. |
| 2004/0017934 A1 | 1/2004 | Kocher | 2004/0239480 A1 | 12/2004 | Beenau et al. |
| 2004/0019494 A1 | 1/2004 | Ridgeway et al. | 2004/0240711 A1 | 12/2004 | Hamza et al. |
| 2004/0019564 A1 | 1/2004 | Goldthwaite et al. | 2004/0255168 A1 | 12/2004 | Murashita et al. |
| 2004/0020982 A1 | 2/2004 | Hoffman et al. | 2004/0257196 A1 | 12/2004 | Kotzin |
| 2004/0021552 A1 | 2/2004 | Koo | 2004/0258282 A1 | 12/2004 | Bjorn et al. |
| 2004/0024694 A1 | 2/2004 | Lawrence et al. | 2005/0001711 A1 | 1/2005 | Doughty et al. |
| 2004/0026518 A1 | 2/2004 | Kudo et al. | 2005/0004921 A1 | 1/2005 | Beenau et al. |
| 2004/0029569 A1 | 2/2004 | Khan et al. | 2005/0005172 A1 | 1/2005 | Haala |
| 2004/0030601 A1 | 2/2004 | Pond et al. | 2005/0011776 A1 | 1/2005 | Nagel |
| 2004/0031856 A1 | 2/2004 | Atsmon et al. | 2005/0017068 A1 | 1/2005 | Zalewski et al. |
| 2004/0039814 A1 | 2/2004 | Crabtree et al. | 2005/0018658 A1 | 1/2005 | Ikeda et al. |
| 2004/0039860 A1 | 2/2004 | Mills et al. | 2005/0020304 A1 | 1/2005 | Shinzaki |
| 2004/0041021 A1 | 3/2004 | Nugent, Jr. | 2005/0021457 A1 | 1/2005 | Johnson et al. |
| 2004/0041690 A1 | 3/2004 | Yamagishi | 2005/0023157 A1 | 2/2005 | Logan |
| 2004/0044627 A1 | 3/2004 | Russell et al. | 2005/0033686 A1 | 2/2005 | Peart et al. |
| 2004/0046034 A1 | 3/2004 | EyYamani et al. | 2005/0033687 A1 | 2/2005 | Beenau et al. |
| 2004/0049687 A1 | 3/2004 | Orsini | 2005/0033688 A1 | 2/2005 | Peart et al. |
| 2004/0050930 A1 | 3/2004 | Rowe | 2005/0033689 A1 | 2/2005 | Bonalle et al. |
| 2004/0052406 A1 | 3/2004 | Brooks | 2005/0033992 A1 | 2/2005 | Inabe |
| 2004/0059923 A1 | 3/2004 | ShamRao | 2005/0035192 A1 | 2/2005 | Bonalle et al. |

| | | | | | | |
|---|---|---|---|---|---|---|
| 2005/0035847 A1 | 2/2005 | Bonalle et al. | | 2006/0016874 A1 | 1/2006 | Bonalle et al. |
| 2005/0036665 A1 | 2/2005 | Higuchi | | 2006/0016875 A1 | 1/2006 | Bonalle et al. |
| 2005/0038718 A1 | 2/2005 | Barnes et al. | | 2006/0016877 A1 | 1/2006 | Bonalle et al. |
| 2005/0040221 A1 | 2/2005 | Schwarz | | 2006/0033609 A1 | 2/2006 | Bridgelall |
| 2005/0040272 A1 | 2/2005 | Argumedo et al. | | 2006/0034492 A1 | 2/2006 | Siegel et al. |
| 2005/0045718 A1 | 3/2005 | Bortolin et al. | | 2006/0066444 A1 | 3/2006 | Steeves |
| 2005/0050367 A1 | 3/2005 | Burger et al. | | 2006/0069635 A1 | 3/2006 | Ram et al. |
| 2005/0054438 A1 | 3/2005 | Rothschild et al. | | 2006/0071756 A1 | 4/2006 | Steeves |
| 2005/0058262 A1 | 3/2005 | Timmins et al. | | 2006/0080552 A1 | 4/2006 | Lauper |
| 2005/0060233 A1 | 3/2005 | Bonalle et al. | | 2006/0095369 A1 | 5/2006 | Hofi |
| 2005/0065842 A1 | 3/2005 | Summers | | 2006/0136336 A1 | 6/2006 | Drummond et al. |
| 2005/0065872 A1 | 3/2005 | Moebs et al. | | 2006/0178937 A1 | 8/2006 | Rau et al. |
| 2005/0071231 A1 | 3/2005 | Beenau et al. | | 2007/0241861 A1 | 10/2007 | Venkatanna et al. |
| 2005/0087597 A1 | 4/2005 | Gotfried et al. | | 2007/0252001 A1 | 11/2007 | Kail et al. |
| 2005/0091325 A1 | 4/2005 | Kuwana et al. | | 2007/0284432 A1 | 12/2007 | Abouyounes |
| 2005/0097038 A1 | 5/2005 | Yu et al. | | 2008/0008359 A1 | 1/2008 | Beenau et al. |
| 2005/0098621 A1 | 5/2005 | deSylva | | | | |
| 2005/0100199 A1 | 5/2005 | Boshra | | FOREIGN PATENT DOCUMENTS | | |
| 2005/0102524 A1 | 5/2005 | Haala | | | | |
| 2005/0103839 A1 | 5/2005 | Hewel | | CH | 689070 | 8/1998 |
| 2005/0109836 A1 | 5/2005 | Ben-Aissa | | CH | 689680 | 8/1999 |
| 2005/0113137 A1 | 5/2005 | Rodriguez et al. | | DE | 2847756 | 5/1980 |
| 2005/0116024 A1 | 6/2005 | Beenau et al. | | DE | 3636921 | 5/1981 |
| 2005/0119978 A1 | 6/2005 | Ates | | DE | 3941070 | 6/1991 |
| 2005/0121512 A1 | 6/2005 | Wankmueller | | DE | 4339460 | 11/1993 |
| 2005/0122209 A1 | 6/2005 | Black | | DE | 29702538 | 4/1997 |
| 2005/0123137 A1 | 6/2005 | McCallum | | DE | 19741726 | 9/1997 |
| 2005/0125312 A1 | 6/2005 | Dearing et al. | | DE | 10203926 | 1/2002 |
| 2005/0125343 A1 | 6/2005 | Mendelovich | | EP | 0181770 | 5/1986 |
| 2005/0127164 A1 | 6/2005 | Wankmueller | | EP | 0343829 | 11/1989 |
| 2005/0137977 A1 | 6/2005 | Wankmueller | | EP | 0354817 | 2/1990 |
| 2005/0139669 A1 | 6/2005 | Arnouse | | EP | 0 358 525 A2 | 3/1990 |
| 2005/0144133 A1 | 6/2005 | Hoffman et al. | | EP | 0368570 | 5/1990 |
| 2005/0149358 A1 | 7/2005 | Sacco et al. | | EP | 0388090 | 9/1990 |
| 2005/0149926 A1 | 7/2005 | Saltz | | EP | 0 424 726 A1 | 10/1990 |
| 2005/0160271 A9 | 7/2005 | Brundage et al. | | EP | 0403134 | 12/1990 |
| 2005/0160790 A1 | 7/2005 | Tanaka et al. | | EP | 0411602 | 2/1991 |
| 2005/0165684 A1 | 7/2005 | Jensen et al. | | EP | 0473998 | 3/1992 |
| 2005/0166062 A1 | 7/2005 | Sanchez-Cifuentes | | EP | 0481388 | 4/1992 |
| 2005/0169504 A1 | 8/2005 | Black | | EP | 0531605 | 3/1993 |
| 2005/0171787 A1 | 8/2005 | Zagami | | EP | 0552047 | 7/1993 |
| 2005/0171905 A1 | 8/2005 | Wankmueller | | EP | 0560318 | 9/1993 |
| 2005/0180618 A1 | 8/2005 | Black | | EP | 0568185 | 11/1993 |
| 2005/0187883 A1 | 8/2005 | Bishop et al. | | EP | 0657297 | 6/1995 |
| 2005/0187916 A1 | 8/2005 | Levin et al. | | EP | 0721850 | 7/1996 |
| 2005/0197923 A1 | 9/2005 | Kilner et al. | | EP | 0735505 | 10/1996 |
| 2005/0203857 A1 | 9/2005 | Friedman | | EP | 0780839 | 6/1997 |
| 2005/0207002 A1 | 9/2005 | Liu et al. | | EP | 0789316 | 8/1997 |
| 2005/0211784 A1 | 9/2005 | Justin | | EP | 0854461 | 7/1998 |
| 2005/0212657 A1 | 9/2005 | Simon | | EP | 0866420 | 9/1998 |
| 2005/0216424 A1 | 9/2005 | Gandre et al. | | EP | 0894620 | 2/1999 |
| 2005/0221853 A1 | 10/2005 | Silvester | | EP | 0916519 | 5/1999 |
| 2005/0223230 A1 | 10/2005 | Zick | | EP | 0917120 | 5/1999 |
| 2005/0232471 A1 | 10/2005 | Baer | | EP | 0927945 | 7/1999 |
| 2005/0240778 A1 | 10/2005 | Saito | | EP | 0 933 717 A2 | 8/1999 |
| 2005/0246292 A1 | 11/2005 | Sarcanin | | EP | 0949595 | 10/1999 |
| 2005/0251688 A1 | 11/2005 | Nanavati et al. | | EP | 0 956 818 A1 | 11/1999 |
| 2005/0261972 A1 | 11/2005 | Black | | EP | 0 959 440 A2 | 11/1999 |
| 2005/0275505 A1 | 12/2005 | Himmelstein | | EP | 0 984 404 A2 | 3/2000 |
| 2005/0278222 A1 | 12/2005 | Northrup | | EP | 1 016 947 A2 | 7/2000 |
| 2006/0000892 A1 | 1/2006 | Bonalle et al. | | EP | 1017030 | 7/2000 |
| 2006/0000893 A1 | 1/2006 | Bonalle et al. | | EP | 1 039 403 A2 | 9/2000 |
| 2006/0000894 A1 | 1/2006 | Bonalle et al. | | EP | 1 104 909 A2 | 6/2001 |
| 2006/0000895 A1 | 1/2006 | Bonalle et al. | | EP | 1 113 387 A2 | 7/2001 |
| 2006/0000896 A1 | 1/2006 | Bonalle, et al. | | EP | 1115095 | 7/2001 |
| 2006/0000897 A1 | 1/2006 | Bonalle et al. | | EP | 1 199 684 A2 | 4/2002 |
| 2006/0000898 A1 | 1/2006 | Bonalle et al. | | EP | 1 251 450 A1 | 10/2002 |
| 2006/0000899 A1 | 1/2006 | Bonalle et al. | | EP | 1345146 | 9/2003 |
| 2006/0005022 A1 | 1/2006 | Wakamori et al. | | EP | 1610273 | 12/2005 |
| 2006/0005042 A1 | 1/2006 | Black | | GB | 1371254 | 10/1974 |
| 2006/0016868 A1 | 1/2006 | Bonalle et al. | | GB | 2088110 | 6/1982 |
| 2006/0016869 A1 | 1/2006 | Bonalle et al. | | GB | 2108906 | 5/1985 |
| 2006/0016871 A1 | 1/2006 | Bonalle et al. | | GB | 2240948 | 8/1991 |

| | | |
|---|---:|---|
| GB | 2281714 | 3/1995 |
| GB | 2347537 | 9/2000 |
| GB | 2350021 | 11/2000 |
| GB | 2361790 | 10/2001 |
| JP | 61-100436 | 5/1986 |
| JP | 62-043774 | 3/1987 |
| JP | 62-264999 | 11/1987 |
| JP | 63-071794 | 4/1988 |
| JP | 63-098689 | 4/1988 |
| JP | 63-072721 | 5/1988 |
| JP | 63-175987 | 7/1988 |
| JP | 64-004934 | 1/1989 |
| JP | 64-087395 | 3/1989 |
| JP | 64-087396 | 3/1989 |
| JP | 64-087397 | 3/1989 |
| JP | 02-130737 | 5/1990 |
| JP | 02-252149 | 10/1990 |
| JP | 03-290780 | 12/1991 |
| JP | 42-005596 | 7/1992 |
| JP | 04-303692 | 10/1992 |
| JP | 05-069689 | 3/1993 |
| JP | 05-254283 | 10/1993 |
| JP | 06-183187 | 7/1994 |
| JP | 06-191137 | 7/1994 |
| JP | 06-234287 | 8/1994 |
| JP | 07-173358 | 7/1995 |
| JP | 07-205569 | 8/1995 |
| JP | 08-244385 | 9/1996 |
| JP | 08-324163 | 12/1996 |
| JP | 09-050505 | 2/1997 |
| JP | 09-052240 | 2/1997 |
| JP | 02-274640 | 10/1997 |
| JP | 10-129161 | 5/1998 |
| JP | 10-289296 | 10/1998 |
| JP | 10302160 | 11/1998 |
| JP | 10-334206 | 12/1998 |
| JP | 10-340231 | 12/1998 |
| JP | 11-175640 | 7/1999 |
| JP | 11-227367 | 8/1999 |
| JP | 11-353425 | 12/1999 |
| JP | 2000-1109 A | 1/2000 |
| JP | 2000-015288 A | 1/2000 |
| JP | 2000-40181 A | 2/2000 |
| JP | 2000-048153 | 2/2000 |
| JP | 2000-67312 A | 3/2000 |
| JP | 2000-163538 | 6/2000 |
| JP | 2000-177229 | 6/2000 |
| JP | 2000-194799 | 7/2000 |
| JP | 2000-207641 A | 7/2000 |
| JP | 2000-222176 | 8/2000 |
| JP | 2000-252854 | 9/2000 |
| JP | 2001-5931 A | 1/2001 |
| JP | 2001-504406 | 4/2001 |
| JP | 2001-134536 | 5/2001 |
| JP | 2001-160105 | 6/2001 |
| JP | 2001-283122 A | 10/2001 |
| JP | 2001-315475 | 11/2001 |
| JP | 2002-032687 | 1/2002 |
| JP | 2002-109584 | 4/2002 |
| JP | 2002-133335 | 5/2002 |
| JP | 2002-133336 | 5/2002 |
| JP | 2002-157530 | 5/2002 |
| JP | 2002-163585 | 6/2002 |
| JP | 2002-183443 | 6/2002 |
| JP | 2002-274087 | 9/2002 |
| JP | 2003-288646 | 10/2003 |
| JP | 2004-164347 | 6/2004 |
| JP | 2004-348478 | 12/2004 |
| WO | WO 81/00776 | 3/1981 |
| WO | WO 89/03760 | 5/1989 |
| WO | WO 90/08661 | 8/1990 |
| WO | WO 91/08910 | 6/1991 |
| WO | WO 92/16913 | 10/1992 |
| WO | WO 95/32919 | 12/1995 |
| WO | WO 95/35546 | 12/1995 |
| WO | WO 96/06409 | 2/1996 |
| WO | WO 96/18972 | 6/1996 |
| WO | WO 97/09688 | 3/1997 |
| WO | WO 97/40459 | 10/1997 |
| WO | WO 98/21683 | 5/1998 |
| WO | WO 98/22291 | 5/1998 |
| WO | WO 98/45778 | 10/1998 |
| WO | WO 99/03057 A1 | 1/1999 |
| WO | WO 99/12136 | 3/1999 |
| WO | WO 99/14055 | 3/1999 |
| WO | WO 99/21321 | 4/1999 |
| WO | WO 99/27492 | 6/1999 |
| WO | WO 99/40548 | 8/1999 |
| WO | WO 99/47983 | 9/1999 |
| WO | WO 99/49424 | 9/1999 |
| WO | WO 00/10144 A1 | 2/2000 |
| WO | WO 00/38088 A1 | 6/2000 |
| WO | WO 00/49586 | 8/2000 |
| WO | WO 00/73989 | 12/2000 |
| WO | WO 01/04825 A1 | 1/2001 |
| WO | WO 01/13320 | 2/2001 |
| WO | WO 01/15098 A1 | 3/2001 |
| WO | WO 01/18745 | 3/2001 |
| WO | WO 01/25872 | 4/2001 |
| WO | WO 01/43095 A2 | 6/2001 |
| WO | WO 01/55955 | 8/2001 |
| WO | WO 01/72224 A1 | 10/2001 |
| WO | WO 01/77856 A1 | 10/2001 |
| WO | WO 01/78024 | 10/2001 |
| WO | WO 01/80473 A2 | 10/2001 |
| WO | WO 01/86535 A1 | 11/2001 |
| WO | WO 01/86599 | 11/2001 |
| WO | WO 01/90962 A1 | 11/2001 |
| WO | WO 01/95243 A2 | 12/2001 |
| WO | WO 02/01485 A1 | 1/2002 |
| WO | WO 02/13134 A2 | 2/2002 |
| WO | WO 02/21903 A1 | 3/2002 |
| WO | WO 02/063545 A2 | 8/2002 |
| WO | WO 02/065246 A2 | 8/2002 |
| WO | WO 02/065404 A2 | 8/2002 |
| WO | WO 02/069221 A1 | 9/2002 |
| WO | WO 02/073512 A1 | 9/2002 |
| WO | WO 02/086665 A2 | 10/2002 |
| WO | WO 02/091281 A2 | 11/2002 |
| WO | WO 02/097575 A2 | 12/2002 |
| WO | WO 02/101670 A2 | 12/2002 |
| WO | WO 03/007623 | 1/2003 |
| WO | WO 2004/52657 | 10/2008 |

OTHER PUBLICATIONS

"What's New: Timex Watch Features Speedpass System", http://www.speedpass.com/news/article.jsp?id=51 (1 page).

"Physical Reality: A Second Look", Ken Sharp, Senior Technical Editor, http://www.idsystems.com/reader/1999_03/phys0399_pt2/phys0399_pt2.htm (6 pages).

"'Magic Wands' to Speed Mobile Sales", BobBrewin, Jan. 15, 2001, http://www.computerworld.com/mobiletopics/mobile/story/1,10801,563300.html (4 pages).

"Mobile Speedpass Goes Global as Mobil Singapore Rolls Out Asia's First RFID-Based Pay-At-The-Pump System", Press Release, Apr. 5, 1999, http://www.ti.com/tiris/docs/news_releases/rel12.htm (3 pages).

"Speedpass Unleashed", Jun. 4, 2002 http://www.cardweb.com/cardtrak/news/cf2_20a_97.html (2 pages).

Prophecy Central Update #9, Oct. 10, 1997, http://www.bible-prophecy.com/pcu9.htm (5 pages).

International Newsletter of the TI RFID Group, Issue 20, 2000 (12 pages).

"CES: Microsoft's SPOT Technology has Humble Origins", by James Niccolai, Jan. 10, 2003, http://archive.inforworld.com/articles/hn/xml/03/01/10/030110hnspot.xml?s=IDGNS (3 pages).

"Microsoft: See SPOT Run On Your Wrist", by Richard Shim, Jun. 5, 2003, http://news.com.com/2100-1041_3-1013442.html?tag=fd_top (1 page).

"Networking: Microsoft SPOT", by Jeremy A. Kaplan, Jul. 1, 2003, http://www.pcmag.com/print_article/0,3048,a=43561,00.asp (2 pages).

"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).

"Bank Extends RFID Payment Pilot: Bank of America will continue to test its QuickWave RFID payment card for another three months", RFID Journal, Jan. 23, 2003.

"MasterCard to Test RFID Card: Pilot will test whether consumers, merchants and credit card issuers value "contactless" payments", RFID Journal, Dec. 20, 2002.

"Vendors Target Amusement Parks: Protecting children and enabling cashless payments make RFID an appealing option for the entertainment industry", RFID Journal, Nov. 27, 2002.

"Inside's Next-Gen Smart Card: The French company plans to introduce an RFID card that uses a 16-bit microprocessor and new encryption technology", RFID Journal, Oct. 29, 2002.

"Sony, Philips Creating RFID Link: Consumer electronics giants are jointly developing a new RFID standard for payments and for communication between devices", RFID Journal, Sep. 17, 2002.

"Japan Gets Digital Ticket System: A national ticket seller and phone company are teaming up to create an electronic ticket", RFID Journal, Aug. 31, 2002.

"Security for Wireless Java: NTRU, a startup that offers security software, has relased of Java version of its NTRU encryption algorithm", RFID Journal, Jun. 27, 2002.

"Making RFID Payments Ubiquitous: Philips and Visa want people to be able to pay for goods and services anywhere by using RFID chips embedded in the phones and other devices", RFID Journal, 06/02/20003.

"RFID Smart Cards Gain Ground: The convenience of contactless transactions is driving widespread adoption of contactless smart cards", RFID Journal, Apr. 9, 2003.

"TI Embarces Prox Card Standard: Texas Instruments ISO 14443 payment platform promises faster data transfer rates and more security", RFID Journal, Mar. 6, 2003.

"Multiple Frequency Transponders: Volume production of dual-band RFID chips begins", Frontline Solutions, Jul. 16, 2003.

Functional Specification, Standard Card IC MF1 IC S50, Philips Semiconductors, Product Specification Rev. 5.1 May 2001.

"Biometrics: Speaker Verification", by Kulkarni, et al., http://biometrics.cse.msu.edu/speaker.html, Mar. 8, 2004, 5 pages.

"Judge Dismisses FTC Suit Against Rambus", Evers, IDG New Service, http://www.infoworld.corn/article/04/02/18/HNjudgedismisses_1.html, Feb. 18, 2004, 3 pages.

"Credit on Your Key Ring, Buy Gas at Mobil, Exxon and Soon Burgers at McDonald's", by Krakow, MSNBC, http://www.msnbc.msn.com/id/3072638, Feb. 17, 2004, 4 pages.

"The Evolution of Mobile Payment", by McPherson, Financial Insights, Feb. 2, 2004, http://www.banktech.com./story/mews/showArticle/jhtml?article ID=17601432, 2 pages.

"RFID Take Priority With Wal-Mart", by DocMemory, http://www.simmtester.com/page/news/shownews.asp?num=6550, Feb. 9, 2004, 2 pages.

"Microsoft, IBM and Phillips Test RFID Technology", by Rohde, IDG New Service, http:www.computerweekly.com/Article127889.htm, Feb. 9, 2004, 3 pages.

"Pay By Touch Press Releases", http://www.paybytouch.com/press.html, Feb. 10, 2004, 3 pages.

"PowerPay RFID Payment and Marketing Solution Speeds Purchases at Seahawks Stadium with Technology from Texas Instruments", http://www.powerpayit.com/news/Seahawks_pr.html, Feb. 9, 2004, 2 pages.

"Putting Their Finger on It", by Wilson, http://sanfrancisco.bizjournals.com/sanfrancisco/stories/2003/10/20/story6.html?t=printable, Feb. 9, 2004, 2 pages.

"TI Embraces Prox Card Standard", by Roberti, Mar. 6, 2003, http://www.ti.com/tiris/docs/in-the-news/2003/3-6-03.shtml, 2 pages.

"Paying It By Ear", The Guardian, Jan. 18, 2003, http://money.guardian.co.uk/creditanddebt/creditcards/story/0,1456,876908,00.html, 3 pages.

Pay By Touch—Company, http://www.paybytouch.com/company.html.

"Identix Inc.—Empowering IdentificationÖ—Understanding Biometrics", http://www.identix.com/newsroom/news_biometrics_face.html, 1 page.

"International Biometric Group—Signature Biometrics: How It Works", http://www.ibgweb.com./reports/public/reports/signature-scan_tech.html, Feb. 18, 2004, 1 page.

"International Biometric Group—Voice Recognition Technology: How It Works", http://www.ibgweb.com/reports/public/reports/voice-scan_tech.html, Feb. 18, 2004, 1 page.

"The Henry Classification System", International Biometric Group, 7 pages.

"Individual Biometrics—Hand Geometry", http://ctl.ncsc.dni.us/biomet%20web/BMHand.html, Feb. 18, 2004, 2 pages.

"Individual Biometrics—Retinal Scan", http:ctl.ncsc.dni.us/biomet%20web/BMRetinal.html, Feb. 14, 2004, 2 pages.

"Individual Biometrics—Iris Scan", http:ctl.ncsc.dni.us/biomet%20web/BMIris.html, Feb. 18, 2004, 2 pages.

"Individual Biometrics—Vascular Patterns", http:ctl.ncsc.dni.us/biomet%20web/BMVascular.html, Feb. 18, 2004, 1 page.

"Individual Biometrics—Fingerprint", http:ctl.ncsc.dni.us/biomet%20web/BMFingerprint.html, Feb. 18, 2004, 3 pages.

"Fingerprint Technology—Indentix Inc.—Empowering IdentificationÖ—Understanding Biometrics", http://www.identix.com/newsroom/news_biometrics_finger.html, Feb. 18, 2004, 1 page.

"Individual Biometrics—Facial Recognition", http:ctl.ncsc.dni.us/biomet%20web/BMfacial.html, Feb. 18, 2004, 2 pages.

"Fingerprint Analysis—The Basics", http://www.crimtrac.gov.au/fingerprintanalysis.htm, Feb. 18, 2004, 3 pages.

"Visual Speech and Speaker Recognition", by Luettin, Jun. 30, 2000, http://herens.idiap.ch/~luettin/luettin-thesis.bib.abs.html, 1 page.

"Automatic Ear Recognition by Force Field Transformations", by Hurley, et al., The Institution of Electrical Engineers, 2000, pp. 7/1-7/5.

"Everything You Need to Know About Biometrics", by Bowman, Identix Croproation, Jan. 2000, 8 pages.

"How Fingerprint Scanners Work", by Harris, http:computer.howstuffworks.com/fingerprint-scanner.htm/printable, Feb. 18, 2004, 6 pages.

"How Facial Recognition Systems Work", by Bonsor, http://computer.howstuffworks.com/facial-recognition.htm/printable, Feb. 18, 2004, 6 pages.

"Biometrics: Hand Geometry", by Ross, et al., http://biometrics.cse.msu.edu/hand_geometry.html, Feb. 26, 2004, 2 pages.

"Biometric Person Authentication: Odor", by Korotkaya, Department of Information Technology, Laboratory of Applied Mathematics, Lappeenranta University of Technology, 18 pages.

"ISO Magnetic Stripe Card Standards", http://www.cyberd.co.uk/support./technotes/ioscards.htm, Feb. 9, 2004, 4 pages.

"Smart Card Developer's Kit: Some Basic Standards for Smart Cards", http:unix.be.eu.org/docs/smart-card-developer-kit/ch03/033-035.html, Feb. 9, 2004, 2 pages.

Financial Technology International Bulletin, V14, n1, p. 4, Sep. 1996.

Green, Thomas C., "American Express Offers temporary CC numbers for the web," Sep. 9, 2000, The Register, www.theregister.c.uk/c.

CNN.com, U.S. News, "American Express to offer disposable credit card numbers," Sep. 8, 2000, Associated Press, www.cnn.c.

American Express, "Private Payments (sm); A New Level of Security from American Express," American Express Website, Cards.

ISO/IEC 7816-6:1996(E)—First Edition—May 15, 1996.

ISO/IEC 7816-4:1995(E)—First Edition—Sep. 1, 1995.

Derfler, "How Networks Work," Bestseller Edition 1996, Ziff-Davis Press, Emeryville, CA, all pages.

White, "How Computers Work," Millennium Edition, 1999, Que Corporation, Indianapolis, IN, all pages.

Gralia, "How the Internet Works," Millennium Edition, 1999, Que Corporation, Indianapolis, IN, all pages.

Muller, "Desktop Encyclopedia of the Internet," 1999, Artech House Inc., Norwood, MA, all pages.

"The Bank Credit Card Business," American Bankers Association, 1996, all pages.

Menezes, et al., "Handbook of Applied Cryptography," 1997, CRC Press, Chapter 10.

U.S. Appl. No. 60/395,606, filed Jul. 15, 2002.

"Credit Card Offer Travelers New Benefit," PR Newswire, Aug. 5, 1987.

"Inside's Next Gen Smart Card: The French company plans to introduce an RFID card that uses a 16-bit microprocessor and new encryption technology," RFID Journal, Oct. 29, 2002.

"New Evidence about Positive Three-Tier Co-Pay Performance Presented at Express Scripts 2000 Outcomes Conference," PR Newswire Association, Inc., Jun. 28, 2000.

"Prestige Credit Cards: Those Pricey Plastics," Changing Times, Apr. 1986.

"Shell Introduces Optional Credit Card," The Associated Press, Sep. 3, 1985.

"Shell Introducing Expanded 'Signature' Credit Card," Tulsa Business Chronicle, Sep. 5, 1985.

"Shell-Oil: Introduces Shell Signature Travel and Entertainment Credit Card," Business Wire, Sep. 3, 1985.

"The Chase Manhattan Bank Today Announced a Comprehensive Program to Enhance the Value of All of its Credit Cards," PR Newswire, Dec. 18, 1986.

Carey, Gordon, "Multi-tier Copay," Pharmaceutical Executive, Feb. 2000.

Crumbaugh, Darlene M., "Effective Marketing Positions: Check card as consumer lifeline," Hoosier Banker, Apr. 1998, p. 10, vol. 82, issue 4.

Gabber, et al., "Agora: A Minimal Distributed Protocol for Electronic Commerce," USENIX Oakland, CA, Nov. 18, 1996.

Goldwasser, Joan, "Best of the Cash-Back Cards," Kiplinger's Personal Finance Magazine, Apr. 1999.

Kuntz, Mary, "Credit Cards as Good as Gold," Forbes, Nov. 4, 1985.

Lahey, Liam, "Microsoft Bolsters Rebate Structure," Computer Dealer News, Feb. 8, 2002.

Lamond, "Credit Card Transactions Real World and Online," Copyright 1996.

Nyman, Judy, "Free Income Tax Clinics are Opening as April 30 Deadline Draws Nearer," The Toronto Star, Final Edition, Mar. 25, 1986.

Obel, Michael, "Oil Companies Push Marketing, Cost Cutting to Fortify Earnings," Oil & Gas Journal, Sep. 16, 1985.

Schmuckler, Eric, "Playing Your Cards Right," Forbes, Dec. 28, 1987.

"Core One Credit Union—Discover the Advantage," http://coreone.org/2visa.html, Copyright 2001 (last visited Oct. 9, 2002).

Non-Final Office Action issued Apr. 20, 2005 in U.S. Appl. No. 10/192,488.

Final Office Action issued Sep. 8, 2005 in U.S. Appl. No. 10/192,488.

Advisory Action issued Nov. 10, 2005 in U.S. Appl. No. 10/192,488.

Non-Final Office Action issued Jan. 18, 2006 in U.S. Appl. No. 10/192,488.

Final Office Action issued Sep. 25, 2006 in U.S. Appl. No. 10/192,488.

Notice of Allowance issued Feb. 2, 2007 in U.S. Appl. No. 10/192,488.

Examiner's Report dated Oct. 5, 2006 for AU2002318293.

Office Action dated Jun. 28, 2007 in CA 2,452,351.

Office Action dated Apr. 25, 2008 in CA 2,452,351.

Supplemental Search Report dated Nov. 16, 2004 for EP02748120.9.

Examination Report dated Mar. 8, 2005 for EP02748120.9.

Examination Report dated Feb. 8, 2006 for EP02748120.9.

Examination Report dated Oct. 24, 2007 for EP02748120.9.

Office Action dated Mar. 9, 2006 in JP2003-513257.

Office Action dated Oct. 20, 2006 in JP2003-513257.

Office Action dated Aug. 1, 2007 in JP2003-513257.

Office Action dated Jan. 29, 2008 in JP2003-513257.

Office Action dated Jul. 11, 2007 for MX PA/a/2004/000253.

Office Action dated Jan. 27, 2005 in NZ530497.

ISR dated Dec. 30, 2002 for PCT/US02/0219903.

Office Action dated Dec. 30, 2005 for CN02813783.3.

Office Action dated May 16, 2007 for CN02813783.3.

Non-Final Office Action mailed Feb. 8, 2008 in U.S. Appl. No. 10/340,352.

Final Office Action mailed Jun. 13, 2008 in U.S. Appl. No. 10/340,352.

Advisory Action mailed Aug. 19, 2008 in U.S. Appl. No. 10/340,352.

Office Action dated Jan. 29, 2007 for CA2458143.

Office Action dated Dec. 19, 2007 for CA2458143.

Supplemental Search Report dated May 26, 2006 for EP03763325.2.

Examination Report dated Oct. 26, 2006 for EP03763325.2.
Office Action dated Aug. 3, 2006 in JP2004-562629.
Office Action dated Mar. 8, 2007 in JP2004-562629.
Final Office Action dated Oct. 4, 2007 in JP2004-562629.
ISR dated Apr. 22, 2004 for PCT/US03/21279.
Office Action dated Oct. 4, 2007 for JP2007-026166.
Non-Final Office Action issued Nov. 1, 2006 in U.S. Appl. No. 10/905,006.
Notice of Allowance issued Jul. 12, 2007 in U.S. Appl. No. 10/905,006.
Non-Final Office Action issued Jun. 20, 2006 in U.S. Appl. No. 10/318,480.
Notice of Allowance issued Jan. 24, 2007 in U.S. Appl. No. 10/318,480.
Supplemental Notice of Allowance issued Mar. 13, 2007 in U.S. Appl. No. 10/318,480.
ISR dated Apr. 22, 2004 for PCT/US03/21447.
Non-Final Office Action issued Nov. 22, 2005 in U.S. Appl. No. 10/876,822.
Final Office Action issued Aug. 3, 2006 in U.S. Appl. No. 10/876,822.
Non-Final Office Action issued Feb. 6, 2007 in U.S. Appl. No. 10/876,822.
Final Office Action issued Jul. 18, 2007 in U.S. Appl. No. 10/876,822.
Non-Final Office Action issued Jan. 28, 2008 in U.S. Appl. No. 10/876,822.
Final Office Action issued Aug. 22, 2008 in U.S. Appl. No. 10/876,822.
Non-Final Office Action issued Mar. 23, 2006 in U.S. Appl. No. 10/318,432.
Restriction Requirement issued Jan. 17, 2007 in U.S. Appl. No. 10/318,432.
Advisory Action issued Jan. 10, 2007 in U.S. Appl. No. 10/708,822.
Non-Final Office Action issued Apr. 23, 2007 in U.S. Appl. No. 10/708,822.
Notice of Allowance issued Sep. 19, 2007 in U.S. Appl. No. 10/708,822.
ISR/WO dated Nov. 16, 2005 for PCT/US05/09452.
IPRP dated Aug. 16, 2006 for PCT/US05/09452.
IPRP dated Jan. 5, 2007 for PCT/US05/09452.
Non-Final Office Action issued Jan. 22, 2008 in U.S. Appl. No. 11/858,958.
Non-Final Office Action issued Jun. 6, 2005 in U.S. Appl. No. 10/708,830.
Non-Final Office Action issued Oct. 4, 2005 in U.S. Appl. No. 10/708,830.
Notice of Allowance issued Mar. 2, 2006 in U.S. Appl. No. 10/708,830.
Supplemental Notice of Allowance issued Aug. 4, 2006 in U.S. Appl. No. 10/708,830.
Non-Final Office Action issued May 15, 2007 in U.S. Appl. No. 10/708,831.
Notice of Allowance issued Oct. 31, 2007 in U.S. Appl. No. 10/708,831.
Notice of Abandonment issued Mar. 6, 2008 in U.S. Appl. No. 10/708,831.
Non-Final Office Action issued Jun. 6, 2005 in U.S. Appl. No. 10/708,833.
Notice of Allowance issued Dec. 9, 2005 in U.S. Appl. No. 10/708,833.
Supplemental Notice of Allowance issued Feb. 23, 2006 in U.S. Appl. No. 10/708,833.
Non-Final Office Action issued Mar. 22, 2006 in U.S. Appl. No. 10/708,837.
Final Office Action issued Oct. 10, 2006 in U.S. Appl. No. 10/708,837.
Advisory Action issued Jan. 12, 2007 in U.S. Serial No. 10/708,837.
Non-Final Office Action issued Apr. 23, 2007 in U.S. Appl. No. 10/708,837.
Notice of Allowance issued Oct. 12, 2007 in U.S. Appl. No. 10/708,837.
Supplemental Notice of Allowance issued Dec. 20, 2007 in U.S. Appl. No. 10/708,837.
Non-Final Office Action issued Dec. 11, 2007 in U.S. Appl. No. 11/851,533.
Final Office Action issued Jul. 25, 2008 in U.S. Appl. No. 11/851,533.
Advisory Action issued Aug. 29, 2008 in U.S. Appl. No. 11/851,533.
Non-Final Office Action issued Jan. 4, 2008 in U.S. Appl. No. 11/851,556.
Final Office Action issued Jul. 31, 2008 in U.S. Appl. No. 11/851,556.
Non-Final Office Action issued Jan. 10, 2008 in U.S. Appl. No. 10/708,840.
Final Office Action issued Jul. 17, 2008 in U.S. Appl. No. 10/708,840.
Advisory Action issued Sep. 5, 2008 in U.S. Appl. No. 10/708,840.
Non-Final Office Action issued Feb. 8, 2008 in U.S. Appl. No. 11/851,580.
Non-Final Office Action issued Feb. 11, 2008 in U.S. Appl. No. 11/851,623.
Restriction Requirement issued Aug. 20, 2008 in U.S. Appl. No. 11/851,623.
Non-Final Office Action issued Feb. 15, 2008 in U.S. Appl. No. 11/858,393.
Non-Final Office Action issued Jan. 30, 2006 in U.S. Appl. No. 10/708,841.
Final Office Action issued May 25, 2006 in U.S. Appl. No. 10/708,841.
Notice of Allowance issued Oct. 6, 2006 in U.S. Appl. No. 10/708,841.
Non-Final Office Action issued Mar. 11, 2008 in U.S. Appl. No. 11/164,352.
Final Office Action issued Aug. 18, 2008 in U.S. Appl. No. 11/164,352.
ISR/WO dated Jul. 11, 2008 for PCT/US06/07570.
Non-Final Office Action issued Aug. 11, 2004 in U.S. Appl. No. 10/611,563.
Final Office Action issued Mar. 24, 2005 in U.S. Appl. No. 10/611,563.
Advisory Action issued May 18, 2005 in U.S. Appl. No. 10/611,563.
Non-Final Office Action issued Jul. 27, 2005 in U.S. Appl. No. 10/611,563.
Non-Final Office Action issued Nov. 16, 2005 in U.S. Appl. No. 10/611,563.
Final Office Action issued May 31, 2006 in U.S. Appl. No. 10/611,563.
Advisory Action issued Oct. 6, 2006 in U.S. Appl. No. 10/611,563.
Non-Final Office Action issued Jan. 8, 2007 in U.S. Appl. No. 10/611,563.
Non-Final Office Action issued Jun. 18, 2007 in U.S. Appl. No. 10/611,563.

Notice of Allowance issued Aug. 11, 2006 in U.S. Appl. No. 10/906,732.
Non-Final Office Action issued Oct. 15, 2007 in U.S. Appl. No. 11/161,105.
Final Office Action issued Apr. 21, 2008 in U.S. Appl. No. 11/161,105.
Notice of Allowance issued Jul. 3, 2008 in U.S. Appl. No. 11/161,105.
Non-Final Office Action issued Apr. 11, 2008 in U.S. Appl. No. 11/552,886.
Final Office Action issued Aug. 6, 2008 in U.S. Appl. No. 11/552,886.
Advisory Action issued Sep. 18, 2008 in U.S. Appl. No. 11/552,886.
Notice of Allowance issued Sep. 24, 2007 in U.S. Appl. No. 10/611,563.
ISR dated Mar. 26, 2004 for PCT/US03/34602.
WO dated Oct. 13, 2004 for PCT/US03/34602.
IPER dated Jan. 20, 2005 for PCT/US03/34602.
Office Action dated Feb. 16, 2005 for TW092131042.
Office Action dated May 18, 2006 for AR 041912 A1.
Office Action dated Mar. 8, 2007 for AR 041912 A1.
Non-Final Office Action issued Apr. 1, 2008 in U.S. Appl. No. 10/810,473.
Non-Final Office Action issued Oct. 17, 2007 in U.S. Appl. No. 10/710,611.
Final Office Action issued May 28, 2008 in U.S. Appl. No. 10/710,611.
Advisory Action issued Sep. 5, 2008 in U.S. Appl. No. 10/710,611.
Non-Final Office Action issued Mar. 4, 2008 in U.S. Appl. No. 10/711,720.
Final Office Action issued Jul. 23, 2008 in U.S. Appl. No. 10/711,720.
Non-Final Office Action issued Jul. 7, 2005 in U.S. Appl. No. 10/708,548.
Notice of Allowance issued Jan. 31, 2006 in U.S. Appl. No. 10/708,548.
Non-Final Office Action issued Feb. 25, 2008 in U.S. Appl. No. 10/708,569.
Non-Final Office Action issued Sep. 24, 2007 in U.S. Appl. No. 10/708,547.
Final Office Action issued Feb. 14, 2008 in U.S. Appl. No. 10/708,547.
Advisory Action issued Jul. 29, 2008 in U.S. Appl. No. 10/708,547.
Non-Final Office Action issued Mar. 22, 2006 in U.S. Appl. No. 10/708,597.
Final Office Action issued Oct. 10, 2006 in U.S. Appl. No. 10/708,597.
Restriction Requirement issued Mar. 22, 2007 in U.S. Appl. No. 10/708,597.
Non-Final Office Action issued Aug. 8, 2007 in U.S. Appl. No. 10/708,597.
Final Office Action issued Mar. 17, 2008 in U.S. Appl. No. 10/708,597.
Advisory Action issued Jul. 11, 2008 in U.S. Appl. No. 10/708,597.
Non-Final Office Action issued Nov. 1, 2007 in U.S. Appl. No. 10/746,781.
Final Office Action issued Jul. 10, 2008 in U.S. Appl. No. 10/746,781.
Ex-Parte Quayle Action issued Dec. 14, 2005 in U.S. Appl. No. 10/708,549.
Notice of Allowance issued May 8, 2006 in U.S. Appl. No. 10/708,549.
Non-Final Office Action issued May 17, 2007 in U.S. Appl. No. 10/810,469.
Final Office Action issued Jan. 11, 2008 in U.S. Appl. No. 10/810,469.
Advisory Action issued Apr. 30, 2008 in U.S. Appl. No. 10/810,469.
Notice of Allowance issued Aug. 5, 2008 in U.S. Appl. No. 10/810,469.
Final Office Action issued Jul. 28, 2005 in U.S. Appl. No. 10/710,307.
Final Office Action issued Nov. 21, 2005 in U.S. Appl. No. 10/710,307.
Advisory Action issued Feb. 10, 2006 in U.S. Appl. No. 10/710,307.
Non-Final Office Action issued May 2, 2006 in U.S. Appl. No. 10/710,307.
Final Office Action issued Oct. 10, 2006 in U.S. Appl. No. 10/710,307.
Advisory Action issued Jan. 5, 2007 in U.S. Appl. No. 10/710,307.
Non-Final Office Action issued Apr. 10, 2007 in U.S. Appl. No. 10/710,307.
Notice of Allowance issued Oct. 4, 2007 in U.S. Appl. No. 10/710,307.
Supplemental Notice of Allowance issued Nov. 8, 2007 in U.S. Serial No. 710,307.
Office Action dated Mar. 6, 2008 for AU2005270228.
Office Action dated Jun. 18, 2008 for AU2005270228.
Office Action dated Apr. 14, 2008 for CA2570739.
ISR/WO dated Oct. 10, 2006 for PCT/US05/19388.
IPRP dated Mar. 15, 2007 for PCT/US05/19388.
Non-Final Office Action issued Feb. 26, 2008 in U.S. Appl. No. 11/859,153.
Notice of Allowance issued Jun. 20, 2008 in U.S. Appl. No. 11/859,153.
Examination Report dated Jun. 22, 2007 for GB 0700319.7.
Examination Report dated Nov. 22, 2007 for GB 0700319.7.
Search Report dated May 23, 2008 for GB 0700319.7.
Non-Final Office Action issued Feb. 26, 2008 in U.S. Appl. No. 11/859,171.
Notice of Allowance issued Jun. 19, 2008 in U.S. Appl. No. 11/859,171.
Examination Report dated Jun. 16, 2008 for SG200608843-9.
Non-Final Office Action issued Jul. 29, 2005 in U.S. Appl. No. 10/710,308.
Final Office Action issued Nov. 29, 2005 in U.S. Appl. No. 10/710,308.
Advisory Action issued Feb. 10, 2006 in U.S. Appl. No. 10/710,308.
Non-Final Office Action issued May 2, 2006 in U.S. Appl. No. 10/710,308.
Final Office Action issued Oct. 10, 2006 in U.S. Appl. No. 10/710,308.
Advisory Action issued Jan. 8, 2007 in U.S. Appl. No. 10/710,308.
Non-Final Office Action issued May 1, 2007 in U.S. Appl. No. 10/710,308.
Notice of Allowance issued Sep. 26, 2007 in U.S. Appl. No. 10/710,308.
Supplemental Notice of Allowance issued Dec. 11, 2007 in U.S. Appl. No. 10/710,308.
Non-Final Office Action issued Mar. 18, 2008 in U.S. Appl. No. 11/860,704.

Notice of Allowance issued Jul. 3, 2008 in U.S. Appl. No. 11/860,704.
Non-Final Office Action issued Apr. 3, 2008 in U.S. Appl. No. 11/860,726.
Notice of Allowance issued Jul. 14, 2008 in U.S. Appl. No. 11/860,726.
Non-Final Office Action issued Jul. 19, 2005 in U.S. Appl. No. 10/710,309.
Final Office Action issued Nov. 21, 2005 in U.S. Appl. No. 10/710,309.
Advisory Action issued Feb. 10, 2006 in U.S. Appl. No. 10/710,309.
Non-Final Office Action issued May 2, 2006 in U.S. Appl. No. 10/710,309.
Notice of Abandonment issued Dec. 19, 2006 in U.S. Appl. No. 10/710,309.
Non-Final Office Action issued May 6, 2005 in U.S. Appl. No. 10/710,310.
Final Office Action issued Oct. 19, 2005 in U.S. Appl. No. 10/710,310.
Advisory Action issued Dec. 29, 2005 in U.S. Appl. No. 10/710,310.
Non-Final Office Action issued Apr. 5, 2006 in U.S. Appl. No. 10/710,310.
Notice of Abandonment issued Oct. 20, 2006 in U.S. Appl. No. 10/710,310.
Non-Final Office Action issued Sep. 19, 2006 in U.S. Appl. No. 10/710,311.
Notice of Abandonment issued Jun. 28, 2007 in U.S. Appl. No. 10/710,311.
Non-Final Office Action issued Feb. 9, 2006 in U.S. Appl. No. 10/710,315.
Final Office Action issued Jul. 13, 2006 in U.S. Appl. No. 10/710,315.
Notice of Abandonment issued Apr. 20, 2007 in U.S. Appl. No. 10/710,315.
Non-Final Office Action issued Feb. 9, 2006 in U.S. Appl. No. 10/710,317.
Final Office Action issued Jul. 18, 2006 in U.S. Appl. No. 10/710,317.
Notice of Abandonment issued Mar. 22, 2007 in U.S. Appl. No. 10/710,317.
Non-Final Office Action issued Sep. 19, 2006 in U.S. Appl. No. 10/710,319.
Notice of Abandonment issued Aug. 9, 2007 in U.S. Appl. No. 10/710,319.
Non-Final Office Action issued Mar. 9, 2006 in U.S. Appl. No. 10/710,323.
Notice of Abandonment issued Dec. 12, 2006 in U.S. Appl. No. 10/710,323.
Non-Final Office Action issued Oct. 10, 2006 in U.S. Appl. No. 10/710,324.
Notice of Abandonment issued Oct. 11, 2007 in U.S. Appl. No. 10/710,324.
Non-Final Office Action issued Oct. 10, 2006 in U.S. Appl. No. 10/710,325.
Notice of Abandonment issued Jun. 4, 2007 in U.S. Appl. No. 10/710,325.
Non-Final Office Action issued Mar. 22, 2006 in U.S. Appl. No. 10/710,326.
Final Office Action issued Oct. 10, 2006 in U.S. Appl. No. 10/710,326.
Advisory Action issued Jan. 12, 2007 in U.S. Appl. No. 10/710,326.
Non-Final Office Action issued May 1, 2007 in U.S. Appl. No. 10/710,326.
Notice of Allowance issued Oct. 4, 2007 in U.S. Appl. No. 10/710,326.
Supplemental Notice of Allowance issued Nov. 8, 2007 in U.S. Appl. No. 10/710,326.
Non-Final Office Action issued May 1, 2007 in U.S. Appl. No. 10/318,432.
Non-Final Office Action issued Dec. 13, 2007 in U.S. Appl. No. 10/318,432.
Non-Final Office Action issued Jun. 27, 2008 in U.S. Appl. No. 10/318,432.
ISR dated Apr. 22, 2004 for PCT/US03/21280.
Non-Final Office Action issued Mar. 10, 2008 in U.S. Appl. No. 11/160,627.
Final Office Action issued Jun. 24, 2008 in U.S. Appl. No. 11/160,627.
Advisory Action issued Aug. 6, 2008 in U.S. Appl. No. 11/160,627.
Restriction Requirement issued Apr. 30, 2008 in U.S. Appl. No. 11/160,548.
Non-Final Office Action issued Aug. 21, 2008 in U.S. Appl. No. 11/160,548.
Non-Final Office Action issued Jul. 8, 2005 in U.S. Appl. No. 10/708,839.
Final Office Action issued Nov. 21, 2005 in U.S. Appl. No. 10/708,839.
Advisory Action issued Feb. 9, 2006 in U.S. Appl. No. 10/708,839.
Non-Final Office Action issued May 2, 2006 in U.S. Appl. No. 10/708,839.
Final Office Action issued Jan. 25, 2007 in U.S. Appl. No. 10/708,839.
Notice of Abandonment issued Oct. 11, 2007 in U.S. Appl. No. 10/708,839.
Non-Final Office Action issued Sep. 7, 2006 in U.S. Appl. No. 10/708,585.
Notice of Allowance issued May 11, 2007 in U.S. Appl. No. 10/708,585.
Non-Final Office Action issued Nov. 28, 2005 in U.S. Appl. No. 10/708,823.
Final Office Action issued May 17, 2006 in U.S. Appl. No. 10/708,823.
Notice of Abandonment issued Jan. 5, 2007 in U.S. Appl. No. 10/708,823.
Non-Final Office Action issued May 13, 2008 in U.S. Appl. No. 10/708,545.
ISR/WO dated Aug. 19, 2008 for PCT/US05/07905.
Non-Final Office Action issued Sep. 7, 2006 in U.S. Appl. No. 10/708,550.
Notice of Allowance issued May 11, 2007 in U.S. Appl. No. 10/708,550.
ISR/WO dated Feb. 16, 2007 for PCT/US05/36848.
IPRP (Ch 1) dated Apr. 26, 2007 for PCT/US05/36848.
Non-Final Office Action issued Apr. 4, 2007 in U.S. Appl. No. 10/711,965.
Non-Final Office Action issued Oct. 16, 2007 in U.S. Appl. No. 10/711,965.
Final Office Action issued Mar. 28, 2008 in U.S. Appl. No. 10/711,965.
Advisory Action issued Jul. 31, 2008 in U.S. Appl. No. 10/711,965.
Final Office Action issued Aug. 18, 2008 in U.S. Appl. No. 10/711,965.

Non-Final Office Action issued May 4, 2006 in U.S. Appl. No. 10/711,970.
Notice of Allowance issued Feb. 2, 2007 in U.S. Appl. No. 10/711,970.
ISR/WO dated Aug. 17, 2006 for PCT/US05/36828.
IPRP (Ch 1) dated Apr. 26, 2007 for PCT/US05/36828.
Non-Final Office Action issued Feb. 25, 2008 in U.S. Appl. No. 10/711,964.
Final Office Action issued Jun. 30, 2008 in U.S. Appl. No. 10/711,964.
Advisory Action issued Sep. 10, 2008 in U.S. Appl. No. 10/711,964.
Non-Final Office Action issued Oct. 3, 2006 in U.S. Appl. No. 10/711,966.
Final Office Action issued May 21, 2007 in U.S. Appl. No. 10/711,966.
Non-Final Office Action issued Dec. 11, 2007 in U.S. Appl. No. 10/711,966.
Non-Final Office Action issued Nov. 28, 2005 in U.S. Appl. No. 10/708,824.
Final Office Action issued May 17, 2006 in U.S. Appl. No. 10/708,824.
Notice of Abandonment issued Jan. 5, 2007 in U.S. Appl. No. 10/708,824.
Non-Final Office Action issued Dec. 13, 2005 in U.S. Appl. No. 10/708,825.
Final Office Action issued May 11, 2006 in U.S. Appl. No. 10/708,825.
Notice of Abandonment issued Jan. 25, 2007 in U.S. Appl. No. 10/708,825.
Non-Final Office Action issued Nov. 29, 2005 in U.S. Appl. No. 10/708,826.
Final Office Action issued May 17, 2006 in U.S. Appl. No. 10/708,826.
Notice of Abandonment issued Jan. 5, 2007 in U.S. Appl. No. 10/708,826.
Non-Final Office Action issued May 1, 2008 in U.S. Appl. No. 11/861,347.
Non-Final Office Action issued May 2, 2008 in U.S. Appl. No. 11/861,351.
Non-Final Office Action issued May 1, 2008 in U.S. Appl. No. 11/861,354.
Non-Final Office Action issued May 25, 2007 in U.S. Appl. No. 10/710,327.
Notice of Allowance issued Nov. 13, 2007 in U.S. Appl. No. 10/710,327.
Non-Final Office Action issued May 1, 2008 in U.S. Appl. No. 11/861,463.
Non-Final Office Action issued May 8, 2008 in U.S. Appl. No. 11/861,481.
Non-Final Office Action issued Sep. 21, 2006 in U.S. Appl. No. 10/710,328.
Notice of Abandonment issued Jun. 28, 2007 in U.S. Appl. No. 10/710,328.
Non-Final Office Action issued Sep. 19, 2006 in U.S. Appl. No. 10/710,329.
Notice of Abandonment issued Aug. 23, 2007 in U.S. Appl. No. 10/710,329.
Non-Final Office Action issued Mar. 9, 2006 in U.S. Appl. No. 10/710,330.
Notice of Abandonment issued Nov. 17, 2006 in U.S. Appl. No. 10/710,330.
Non-Final Office Action issued Jul. 29, 2005 in U.S. Appl. No. 10/710,331.
Final Office Action issued Nov. 29, 2005 in U.S. Appl. No. 10/710,331.
Advisory Action issued Feb. 9, 2006 in U.S. Appl. No. 10/710,331.
Non-Final Office Action issued May 3, 2006 in U.S. Appl. No. 10/710,331.
Notice of Abandonment issued Jan. 10, 2007 in U.S. Appl. No. 10/710,331.
Non-Final Office Action issued Jul. 19, 2005 in U.S. Appl. No. 10/710,332.
Final Office Action issued Nov. 21, 2005 in U.S. Appl. No. 10/710,332.
Advisory Action issued Feb. 10, 2006 in U.S. Appl. No. 10/710,332.
Non-Final Office Action issued May 3, 2006 in U.S. Appl. No. 10/710,332.
Final Office Action issued Oct. 10, 2006 in U.S. Appl. No. 10/710,332.
Advisory Action issued Jan. 5, 2007 in U.S. Appl. No. 10/710,332.
Non-Final Office Action issued Apr. 20, 2007 in U.S. Appl. No. 10/710,332.
Notice of Allowance issued Oct. 4, 2007 in U.S. Appl. No. 10/710,332.
Supplemental Notice of Allowance issued Nov. 8, 2007 in U.S. Appl. No. 10/710,332.
Non-Final Office Action issued May 2, 2008 in U.S. Appl. No. 11/861,600.
Non-Final Office Action issued May 1, 2008 in U.S. Appl. No. 11/861,626.
Non-Final Office Action issued Jan. 27, 2005 in U.S. Appl. No. 10/710,334.
Final Office Action issued Sep. 30, 2005 in U.S. Appl. No. 10/710,334.
Advisory Action issued Dec. 19, 2005 in U.S. Appl. No. 10/710,334.
Non-Final Office Action issued Apr. 10, 2006 in U.S. Appl. No. 10/710,334.
Notice of Abandonment issued Nov. 6, 2006 in U.S. Appl. No. 10/710,334.
Non-Final Office Action issued Aug. 8, 2005 in U.S. Appl. No. 10/710,335.
Final Office Action issued Dec. 15, 2005 in U.S. Appl. No. 10/710,335.
Advisory Action issued Mar. 8, 2006 in U.S. Appl. No. 10/710,335.
Non-Final Office Action issued May 9, 2006 in U.S. Appl. No. 10/710,335.
Final Office Action issued Oct. 19, 2006 in U.S. Appl. No. 10/710,335.
Advisory Action issued Jan. 12, 2007 in U.S. Appl. No. 10/710,335.
Non-Final Office Action issued Apr. 19, 2007 in U.S. Appl. No. 10/710,335.
Notice of Allowance issued Sep. 19, 2007 in U.S. Appl. No. 10/710,335.
Supplemental Notice of Allowance issued Oct. 25, 2007 in U.S. Appl. No. 10/710,335.
Non-Final Office Action issued May 1, 2008 in U.S. Appl. No. 11/862,268.
Non-Final Office Action issued Aug. 4, 2008 in U.S. Appl. No. 11/306,617.
ISR/WO dated Jul. 9, 2008 for PCT/US06/45362.
Non-Final Office Action issued Jun. 24, 2008 in U.S. Appl. No. 11/161,295.

Non-Final Office Action issued Sep. 8, 2005 in U.S. Appl. No. 10/906,732.
Final Office Action issued Mar. 8, 2006 in U.S. Appl. No. 10/906,732.
Advisory Action issued Jul. 5, 2006 in U.S. Appl. No. 10/906,732.
Non-Final Office Action issued Jan. 10, 2006 in U.S. Appl. No. 10/708,827.
Final Office Action issued May 9, 2006 in U.S. Appl. No. 10/708,827.
Notice of Abandonment issued Jan. 5, 2007 in U.S. Appl. No. 10/708,827.
Non-Final Office Action issued Jan. 27, 2006 in U.S. Appl. No. 10/708,828.
Final Office Action issued Jul. 21, 2006 in U.S. Appl. No. 10/708,828.
Notice of Abandonment issued Mar. 22, 2007 in U.S. Appl. No. 10/708,828.
Non-Final Office Action issued Dec. 15, 2005 in U.S. Appl. No. 10/708,829.
Final Office Action issued May 25, 2006 in U.S. Appl. No. 10/708,829.
Notice of Abandonment issued Jan. 5, 2007 in U.S. Appl. No. 10/708,829.
Non-Final Office Action issued Nov. 27, 2006 in U.S. Appl. No. 10/708,832.
Notice of Abandonment issued Aug. 16, 2007 in U.S. Appl. No. 10/708,832.
Non-Final Office Action issued Jan. 20, 2006 in U.S. Appl. No. 10/708,834.
Final Office Action issued May 25, 2006 in U.S. Appl. No. 10/708,834.
Notice of Abandonment issued Jan. 5, 2007 in U.S. Appl. No. 10/708,834.
Non-Final Office Action issued Dec. 16, 2005 in U.S. Appl. No. 10/708,835.
Final Office Action issued May 17, 2006 in U.S. Appl. No. 10/708,835.
Notice of Abandonment issued Jan. 5, 2007 in U.S. Appl. No. 10/708,835.
Non-Final Office Action issued Dec. 16, 2005 in U.S. Appl. No. 10/708,836.
Final Office Action issued May 25, 2006 in U.S. Appl. No. 10/708,836.
Notice of Abandonment issued Jan. 5, 2007 in U.S. Appl. No. 10/708,836.
Non-Final Office Action issued Aug. 8, 2005 in U.S. Appl. No. 10/708,838.
Final Office Action issued Nov. 29, 2005 in U.S. Appl. No. 10/708,838.
Advisory Action issued Feb. 9, 2006 in U.S. Appl. No. 10/708,838.
Non-Final Office Action issued Apr. 18, 2006 in U.S. Appl. No. 10/708,838.
Notice of Abandonment issued Nov. 1, 2006 in U.S. Appl. No. 10/708,838.
ISR/WO issued Jan. 29, 2008 in PCT/US06/22542.
Non-Final Office Action issued Nov. 1, 2007 in U.S. Appl. No. 10/711,613.
Restriction Requirement issued Aug. 7, 2008 in U.S. Appl. No. 10/711,613.
Non-Final Office Action issued Dec. 9, 2003 in U.S. Appl. No. 10/242,584.
Notice of Allowance issued Jul. 9, 2004 in U.S. Appl. No. 10/242,584.
Office Action dated May 23, 2008 for JP2004-543166.
ISR dated Mar. 7, 2003 for PCT/US02/32653.
WO dated Aug. 27, 2004 for PCT/US02/32653.
IPER dated Jan. 10, 2005 for PCT/US02/32653.
Ex-Parte Quayle Action issued Jun. 6, 2005 in U.S. Appl. No. 10/710,484.
Notice of Allowance issued Aug. 2, 2005 in U.S. Appl. No. 10/710,484.
Non-Final Office Action issued May 17, 2005 in U.S. Appl. No. 10/711,773.
Final Office Action issued Nov. 1, 2005 in U.S. Appl. No. 10/711,773.
Advisory Action issued Feb. 15, 2006 in U.S. Appl. No. 10/711,773.
Notice of Allowance issued May 17, 2006 in U.S. Appl. No. 10/711,773.
ISR/WO dated Jun. 20, 2005 for PCT/US05/07195.
IPRP (Ch 1) dated Apr. 19, 2007 for PCT/US05/07195.
Non-Final Office Action issued Feb. 28, 2006 in U.S. Appl. No. 10/709,815.
Notice of Allowance issued Sep. 26, 2006 in U.S. Appl. No. 10/709,815.
Non-Final Office Action issued Jul. 10, 2008 in U.S. Appl. No. 11/163,595.
Non-Final Office Action issued Jul. 12, 2005 in U.S. Appl. No. 10/708,822.
Final Office Action issued Nov. 2, 2005 in U.S. Appl. No. 10/708,822.
Advisory Action issued Dec. 20, 2005 in U.S. Appl. No. 10/708,822.
Non-Final Office Action issued Apr. 7, 2006 in U.S. Appl. No. 10/708,822.
Final Office Action issued Oct. 19, 2006 in U.S. Appl. No. 10/708,822.
Final Office Action from U.S. Appl. No. 10/708,545 dated May 12, 2009.
Goldman, J., "Internet Security, The Next Generation, When Software Encryption is not Enough," Web Techniques, Nov. 1997, pp. 43-46.
Simmons, J., "Smart Cards Hold the Key to Secure Internet Commerce," EC World, Dec. 1998, pp. 36-38.
Wayner, P., "Digital Cash," AP Professional, 1996, pp. 76-83, 85-100.
Turban, et al., "Using Smartcards in Electronic Commerce," Proc. 31st Annual Hawaii Inter. Conf. on System Sciences, vol. 4, 1998, pp. 62-69.
Dhem, et al., "SCALPS: Smart Card for Limited Payment Systems," IEEE Micro, Jun. 1996, pp. 42-51.
Smith, M.T., "Smart Cards: Integrating for Portable Complexity," Computer-Integrated Engineering, Aug. 1998, pp. 110-115.
Geer, et al., "Token-Mediated Certification and Electronic Commerce," Proc. 2nd USENIX Workshop on Electronic Commerce, Nov. 18-21, 1996, pp. 13-22.
Gobioff, et al., "Smart Cards in Hostile Environments," Proc. 2nd USENIX Workshop in Electronic Commerce, Nov. 18-21, 1996, pp. 23-28.
Fancher, C.H., "In Your Pocket Smartcards," IEEE Spectrum, Feb. 1997, pp. 47-53.
Blythe, I., "Smarter, More Secure Smartcards," BYTE, Jun. 1997, pp. 63-64.
Leach, Dr. J., "Dynamic Authentication for Smartcards," Computers and Security, vol. 14, No. 5, 1995, pp. 385-389.
Wu, et al., "Authenticating Passwords Over an Insecure Channel," Computers and Security, vol. 15, No. 5, 1996, pp. 431-439.

Manninger, et al., "Adapting an Electronic Purse for Internet Payments," ACISP '98 Proceedings, Jul. 13-15, 1998, pp. 205-214.

Yan, et al., "Bankiig on the Internet and Its Applications," Proc. 13th Annual Hawaii International Conference on System Sciences, vol. 4, 1997, pp. 275-284.

Transport Layer Security Working Group, "The SSL Protocol, Version 3.0," Nov. 18, 1996 (also available at http://home.netscape.com/eng/ssl3/draft302.txt).

Business Wire (press release), "Master Card E-Wallet," Jul. 11, 2000.

Obongo.com Website, "Obongo," Aug. 8, 2000 (Description of wallet toolbar also available at http://www.obongo.com/chabi/website/index.htm).

PR Newswire (press release), "Providian Launches Nation's First Clear Chip Card," Sep. 12, 2000. The press release may be related to the art of the invention, but based upon the information in the press release, it is unclear if the press release is prior art. However, in an abundance of caution the Applicant desires to put the press release into the file wrapper.

http://www.semiconductors.phillips.com/news/content/file_878.html, Apr. 7, 2003.

htip://www.palowireless.com/infotooth/whatis.asp, Apr. 28, 2003.

http://www.palowireless.com/infotooth/tutorial.asp, Apr. 28, 2003.

http://www.palowireless.com/infotooth/tutorial/profiles.asp, Apr. 28, 2003.

http://www.palowireless.com/infotooth/tutorial/radio.asp, Apr. 28, 2003.

http://www.polowireless.com/infotooth/tutorial/baseband.asp, Apr. 28, 2003.

http://www.palowireless.com/infotooth/tutorial/Imp.asp, Apr. 28, 2003.

http://www.palowireless.com/infotooth/tutorial/hci.asp, Apr. 28, 2003.

http://www.palowireless.com/infotooth/tutorial/12cap.asp, Apr. 28, 2003.

http://www.palowireless.com/infotooth/tutorial/rfcomm.asp, Apr. 28, 2003.

http://www.palowireless.com/infotooth/tutorial/sdp.asp, Apr. 28, 2003.

http://www.palowireless.com/infotooth/tutorialk1_gap.asp, Apr. 28, 2003.

"Sony, Phillips to Test RFID Platform", RFID Journal, May 8, 2003.

Costco, The Choice is Yours, 1998, http://www.costco.com/frameset.asp?trg=subcat%2Easp&catid=502&subsid=503&log=.

For Partners, Card Co-branding, 2000, http://www.statravel.com.sg/idcards/pcobrand.

USBanker, Article 5, 1995, http://www.banking.com/us-banker/art5.

Martin, Zack, "One-Time Numbers Stop Web Hackers From Pilfering Data," Jan. 2001, Card Marketing, Thomson Financial, www.c rdf rum.c.

The Dollar Stretcher, "Disposable Credit Card Numbers," Jan. 2001, CardRatings.org, www.stretcher.c.

Notice of Allowance & Fees Due for U.S. Appl. No. 10/708,545 mailed Oct. 2, 2009.

* cited by examiner

AUTHENTICATING AN RF TRANSACTION USING A TRANSACTION COUNTER

CROSS-REFERENCE TO RELATED APPLICATIONS

This invention is a continuation in part of and claims priority to U.S. patent application Ser. No. 10/711,720, titled "SYSTEMS AND METHODS FOR MANAGING MULTIPLE ACCOUNTS ON A RF TRANSACTION DEVICE USING SECONDARY IDENTIFICATION INDICIA," filed Sep. 30, 2004. This invention is also a continuation-in-part of and claims priority to U.S. patent application Ser. No. 10/708,545, titled "SYSTEM AND METHOD FOR SECURING RF TRANSACTIONS USING A RADIO FREQUENCY IDENTIFICATION DEVICE INCLUDING A TRANSACTION COUNTER," filed Mar. 10, 2004. Both the '720 and '545 applications claim priority to U.S. Provisional Application No. 60/507,803, filed Sep. 30, 2003. This invention is also a continuation-in-part of and claims priority to U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003 (which itself claims priority to U.S. Provisional Patent Application No. 60/396,577, filed Jul. 16, 2002), and is also a continuation-in-part and claims priority to U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002 (which itself claims priority to U.S. Provisional Patent Application No. 60/304,216, filed Jul. 10, 2001. All of the above-listed applications are incorporated herein by reference.

FIELD OF INVENTION

This invention generally relates to a system and method for securing a Radio Frequency (RF) transaction using a RF operable transaction device, and more particularly, to securing a RF transaction using a Radio Frequency Identification (RFID) device module including a transactions counter.

BACKGROUND OF INVENTION

Like barcode and voice data entry, RFID is a contactless information acquisition technology. RFID systems are wireless, and are usually extremely effective in hostile environments where conventional acquisition methods fail. RFID has established itself in a wide range of markets, such as, for example, the high-speed reading of railway containers, tracking moving objects such as livestock or automobiles, and retail inventory applications. As such, RFID technology has become a primary focus in automated data collection, identification and analysis systems worldwide.

Of late, companies are increasingly embodying RFID data acquisition technology in portable devices are identifiable by hand. For example, RFID modules are being placed in a fob or tag for use in completing financial transactions. A typical fob includes a RF transponder and is ordinarily a self-contained device which may be contained on any portable form factor. In some instances, a battery may be included with the fob to power the transponder, in which case the internal circuitry of the fob (including the transponder) may draw its operating power from the battery power source. Alternatively, the fob may exist independent of an internal power source. In this instance the internal circuitry of the fob (including the transponder) may gain its operating power directly from an RF interrogation signal provided by a RF reader. U.S. Pat. No. 5,053,774, issued to Schuermann, describes a typical transponder RF interrogation system which may be found in the prior art. The Schuermann patent describes in general the powering technology surrounding conventional transponder structures. U.S. Pat. No. 4,739,328 discusses a method by which a conventional transponder may respond to a RF interrogation signal. Other typical modulation techniques which may be used include, for example, ISO/IEC 14443 and the like.

In the conventional fob powering technologies used, the fob is typically activated upon presenting the fob in an interrogation signal. In this regard, the fob may be activated irrespective of whether the user desires such activation. These are called "passive" RFID devices. Alternatively, the fob may have an internal power source such that interrogation by the reader to activate the fob is not required. These RFID devices are termed "active" RFID devices.

One of the more visible uses of the RFID technology is found in the introduction of Exxon/Mobil's Speedpass® and Shell's EasyPay® products. These products use transponders placed in a fob or tag which enables automatic identification of the user when the fob is presented at a Point-of-Sale (POS) device. Fob identification data is typically passed to a third-party server database, where the identification data is referenced to a customer (e.g., user) credit or debit account. In an exemplary processing method, the server seeks authorization for the transaction by passing the transaction and account data to an authorizing entity, such as for example an "acquirer" or account issuer. Once the server receives authorization from the authorizing entity, the authorizing entity sends clearance to the point-of-sale device for completion of the transaction.

Minimizing fraud transactions in the RFID environment is typically important to account issuer to lessen the loss associated with fraudulent RFID transaction device usage. One conventional method for securing RFID transactions involves requiring the device user to provide a secondary form of identification during transaction completion. For example, RFID transaction device user may be asked to enter a personal identification number (PIN) into a keypad. The PIN may then be verified against a number associated with the user or RFID transaction device, where the associated number is stored in an account issuer database. If the PIN number provided by the device user matches the associated number, then the transaction may be cleared for completion.

One problem with the conventional method of securing an RFID transaction is that the time for completing the transaction is increased. The increased time is typically due to the RFID device user delaying the transaction to provide the alternate identification. The increased time for completing a transaction defeats one of the real advantages of RFID transaction device, which is to permit expedient completion of a transaction since the account information may be passed to a reader without merchant involvement.

As such, a need exists for a method of securing a RFID transaction which does not increase the time needed to complete a transaction, and wherein the method may be used without device user intervention.

SUMMARY OF INVENTION

The invention includes a system and method for securing RFID transactions which addresses the problems found in conventional transaction securing methods. The securing method includes verifying a RFID transaction device counter, which may generate an indicia corresponding to the number of transactions conducted using a particular RFID transaction device. The method involves variously validating a RFID device authentication tag and a RFID reader authentication tag.

The invention discloses a system and method for verifying a RFID transaction device and RFID reader operable with a RF transaction system. An exemplary method involves presenting a RFID transaction system to a RFID reader, receiving a random number from RFID reader, creating a RFID transaction device authentication tag using the random number and a counter value, providing the random number, counter value, and RFID transaction device authentication tag to a RFID reader, creating a RFID reader authentication tag using counter random number, and RFID authentication tag, and providing RFID reader and RFID transaction device for authentication.

Under a second embodiment, the invention involves verifying RFID transaction device only. In another embodiment, the invention involves verifying RFID reader without verifying RFID transaction device.

These features and other advantages of the system and method, as well as the structure and operation of various exemplary embodiments of the system and method, are described below.

BRIEF DESCRIPTION OF THE DRAWINGS

The accompanying drawings, wherein like numerals depict like elements, illustrate exemplary embodiments of the present invention, and together with the description, serve to explain the principles of the invention. In the drawings.

DETAILED DESCRIPTION

Figure 1:
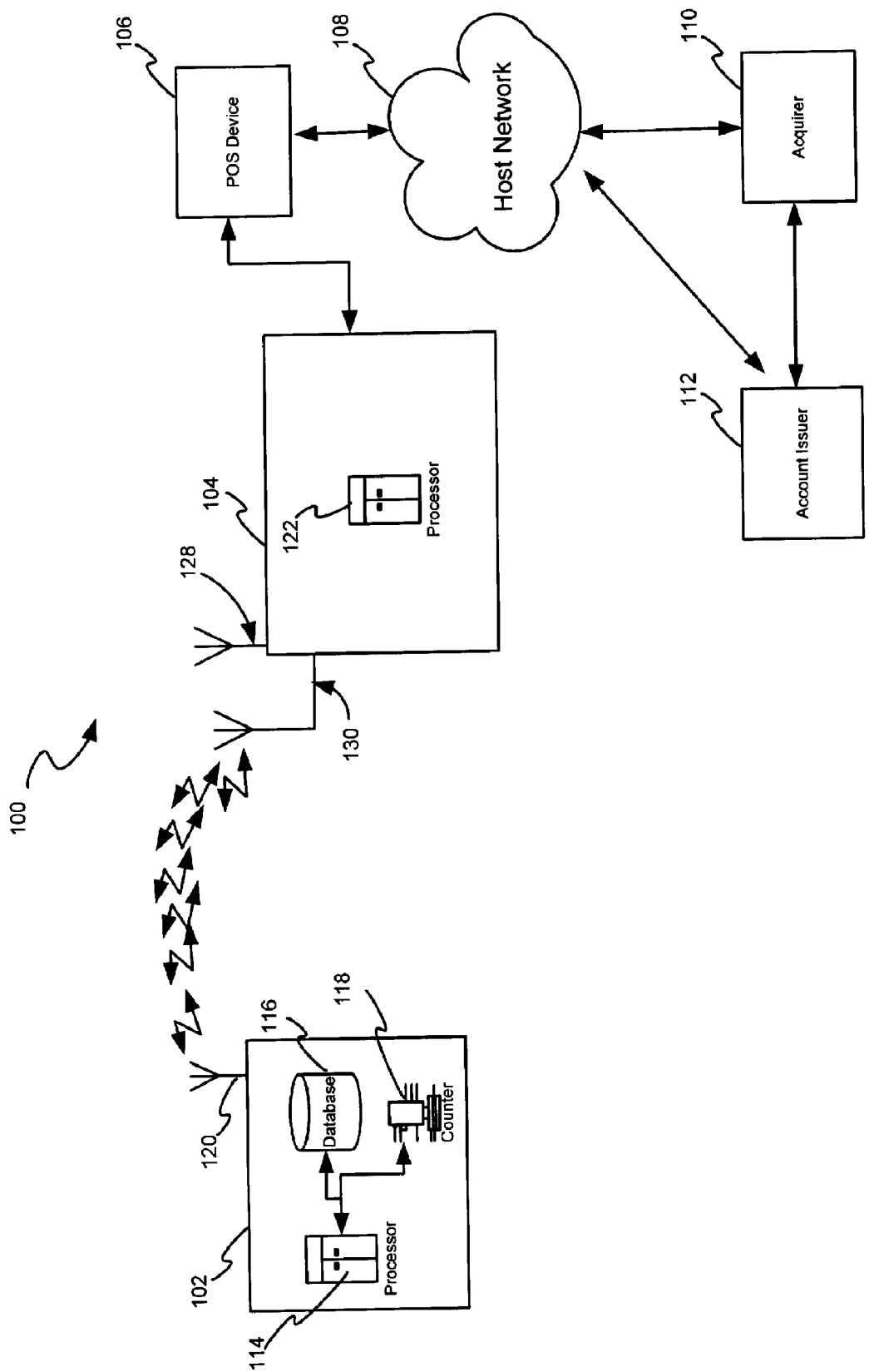
FIG. 1 illustrates an exemplary RFID-based system depicting exemplary components for use in RFID transaction completion in accordance with the present invention.

The present invention may be described herein in terms of functional block components, screen shots, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by john Wiley & Sons (second edition, 1996), herein incorporated by reference.

In addition, many applications of the present invention could be formulated. The exemplary network disclosed herein may include any system for exchanging data or transacting business, such as the Internet, an intranet, an extranet, WAN, LAN, satellite communications, and/or the like. It is noted that the network may be implemented as other types of networks, such as an interactive television network (ITN).

Further still, the terms "Internet" or "network" may refer to the Internet, any replacement, competitor or successor to the Internet, or any public or private inter-network, intranet or extranet that is based upon open or proprietary protocols. Specific information related to the protocols, standards, and application software utilized in connection with the Internet may not be discussed herein. For further information regarding such details, see, for example, Dilip Naik, Internet Standards and Protocols (1998); Java 2 Complete, various authors, (Sybex 1999); Deborah Ray and Eric Ray, Mastering HTML 4.0 (1997); Loshin, TCP/IP Clearly Explained (1997). All of these texts are hereby incorporated by reference.

By communicating, a signal may travel to/from one component to another. The components may be directly connected to each other or may be connected through one or more other devices or components. The various coupling components for the devices can include but are not limited to the Internet, a wireless network, a conventional wire cable, an optical cable or connection through air, water, or any other medium that conducts signals, and any other coupling device or medium.

Where required, the system user may interact with the system via any input device such as, a keypad, keyboard, mouse, kiosk, personal digital assistant, handheld computer (e.g., Palm Pilot®, Blackberry®), cellular phone and/or the like). Similarly, the invention could be used in conjunction with any type of personal computer, network computer, work station, minicomputer, mainframe, or the like running any operating system such as any version of Windows, Windows NT, Windows 2000, Windows 98, Windows 95, MacOS, OS/2, BeOS, Linux, UNIX, Solaris or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates the use, sale, or distribution of any goods, services or information over any network having similar functionality described herein.

A variety of conventional communications media and protocols may be used for data links providing physical connections between the various system components. For example, the data links may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system including the POS device 106 and host network 108 may reside on a local area network which interfaces to a remote network (not shown) for remote authorization of an intended transaction. POS 106 may communicate with the remote network via a leased line, such as a T1, D3 line, or the like. Such communications lines are described in a variety of texts, such as, "Understanding Data Communications," by Gilbert Held, which is incorporated herein by reference.

A transaction device identifier, as used herein, may include any identifier for a transaction device which may be correlated to a user transaction account (e.g., credit, charge debit, checking, savings, reward, loyalty, or the like) maintained by a transaction account provider (e.g., payment authorization center). A typical transaction account identifier (e.g., account number) may be correlated to a credit or debit account, loyalty account, or rewards account maintained and serviced by such entities as American Express, Visa and/or MasterCard, or the like.

To facilitate understanding, the present invention may be described with respect to a credit account. However, it should be noted that the invention is not so limited and other accounts permitting an exchange of goods and services for an account data value is contemplated to be within the scope of the present invention.

A transaction device identifier may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". In a typical example, the first five to seven digits are reserved for processing purposes and identify the issuing bank, card type and, etc. In this example, the last sixteenth digit is used as a sum check for the sixteen-digit number. The intermediary eight-to-ten digits are used to uniquely identify the customer. The account number stored as Track 1 and Track 2 data as defined in ISO/IEC 7813, and further may be made unique to RFID transaction device.

In one exemplary embodiment, transaction device identifier may include a unique RFID transaction device serial number and user identification number, as well as specific application applets. Transaction device identifier may be stored on a transaction device database located on transaction device. Transaction device database may be configured to store multiple account numbers issued to RFID transaction device user by the same or different account providing institutions. In addition, where the device identifier corresponds to a loyalty or rewards account, RFID transaction device database may be configured to store the attendant loyalty or rewards points data.

The merchant database locations maintained on database 116 by server 110 are provided a distinct merchant identifier. Database discussed herein may be a graphical, hierarchical, relational, object-oriented or other database, and may be maintained on a local drive of a server or on a separate computer coupled to the server via a local area or other network (not shown). In one embodiment, databases disclosed are a collection of ASCII or other text files stored on a local drive of server. Database information is suitably retrieved from the database and provided to transaction processing systems upon request via a server application, as described more fully below.

In addition to the above, transaction device identifier may be associated with any secondary form of identification configured to allow the consumer to interact or communicate with a payment system. For example, transaction device identifier may be associated with, for example, an authorization/access code, personal identification number (PIN), Internet code, digital certificate, biometric data, and/or other secondary identification data used to verify a transaction device user identity.

It should be further noted that conventional components of RFID transaction devices may not be discussed herein for brevity. For instance, one skilled in the art will appreciate that RFID transaction device and RFID reader disclosed herein include traditional transponders, antennas, protocol sequence controllers, modulators/demodulators and the like, necessary for proper RFID data transmission. As such, those components are contemplated to be included in the scope of the invention.

It should be noted that the transfer of information in accordance with this invention, may be done in a format recognizable by a merchant system or account issuer. In that regard, by way of example, the information may be transmitted in magnetic stripe or multi-track magnetic stripe format. Because of the proliferation of devices using magnetic stripe format, the standards for coding information in magnetic stripe format were standardized by the International Standards Organization (ISO).

Typically, magnetic stripe information is formatted in three tracks. Certain industry information must be maintained on certain portion of the tracks, while other portions of the tracks may have open data fields. The contents of each track and the formatting of the information provided to each track is controlled by ISO standard ISO/IEC 7811. For example, the information must typically be encoded in binary. Track 1 is usually encoded with user information (name) in alphanumeric format. Track 2 is typically comprised of discretionary and non-discretionary data fields. In one example, the non-discretionary field may comprise 19 characters and the discretionary field may comprise 13 characters. Track 3 is typically reserved for financial transactions and includes enciphered versions of the user's personal identification number, country code, currently units amount authorized per cycle, subsidiary accounts, and restrictions.

As such, where information is provided in accordance with this invention, it may be provided in magnetic stripe format track. For example, counter values, authentication tags and encrypted identifiers, described herein, may be forwarded encoded in all or a portion of a data stream representing data encoded in, for example, track 2 or track 3 format.

Further still, various components may be described herein in terms of their "validity." In this context, a "valid" component is one which is authorized for use in completing a transaction request in accordance with the present invention. Contrarily, an "invalid" component is one which is not authorized for transaction completion. In addition, an invalid component may be one which is not recognized as being permitted for use on the secure RF system described herein.

FIG. 1 illustrates an exemplary secure RFID transaction system 100 in accordance with the present invention, wherein exemplary components for use in completing a RF transaction are depicted. In general, system 100 may include a RFID transaction device 102 in RF communication with a RFID reader 104 for transmitting data there between. RFID reader 104 may be in further communication with a merchant point-of-sale (POS) device 106 for providing to POS 106 data received from RFID transaction device 102. POS 106 may be in further communication with an acquirer 110 or an account issuer 112 via host network 108 for transmitting a transaction request, including information received from RFID reader 104, and receiving authorization concerning transaction completion.

Although the point-of-interaction device (POS) is described herein with respect to a merchant point-of-sale (POS) device, the invention is not to be so limited. Indeed, a merchant POS device is used herein by way of example, and the point-of-interaction device may be any device capable of receiving transaction device account data. In this regard, the POS may be any point-of-interaction device enabling the user to complete a transaction using a transaction device 102. POS device 106 may receive RFID transaction device 102 information and provide the information to host network 108 for processing.

As used herein, an "acquirer" may be a third-party entity including various databases and processors for facilitating the routing of the transaction request to an appropriate account issuer 112. Acquirer 110 may route the request to account issuer in accordance with a routing number provided by RFID transaction device 102. The "routing number" in this context may be a unique network address or any similar device for locating an account issuer 112 on host network 108. Traditional means of routing the payment request in accordance with the routing number are well understood. As such, the process for using a routing number to provide the payment request will not be discussed herein for brevity.

Additionally, account issuer 112 ("account provider" or "issuer system") may be any entity which provides a transaction account for facilitating completion of a transaction request. The transaction account may be any credit, debit, loyalty, direct debit, checking, or savings, or the like. The term "issuer" or "account provider" may refer to any entity facilitating payment of a transaction using a transaction device, and which includes systems permitting payment using at least one of a preloaded and non-preloaded transaction device. Typical issuers may be American Express, MasterCard, Visa, Discover, and the like. In the preloaded value processing context, an exchange value (e.g., money, rewards points, barter points, etc.) may be stored in a preloaded value database (not shown) for use in completing a requested transaction. The preloaded value database and thus the exchange value may not be stored on transaction device itself, but may be stored remotely, such as, for example, at account issuer 112 location. Further, the preloaded value database may be debited the amount of the transaction requiring the value to be replenished. The preloaded value may be any conventional value (e.g., monetary, rewards points, barter points, etc.) which may be exchanged for goods or services. In that regard, the preloaded value may have any configuration as determined by issuer system 112.

In general, during operation of secure system 100, RFID reader 104 may provide an interrogation signal to transaction device 102 for powering device 102 and receiving transaction device related data. The interrogation signal may be received at a transaction device antenna 120 and may be further provided to a transponder (not shown). In response, a transaction device processor 114 may retrieve a transaction device identifier from a transaction device database 116 for providing to RFID reader 104 to complete a transaction request. Typically, transaction device identifier may be encrypted prior to providing the device identifier to a modulator/demodulator (not shown) for providing the identifier to RFID reader 104.

It should be noted that RFID reader 104 and RFID transaction device 102 may engage in mutual authentication prior to transferring any transaction device 102 data to RFID reader 104. For a detailed explanation of a suitable mutual authentication process for use with the invention, please refer to commonly owned U.S. patent application Ser. No. 10/340, 352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003, incorporated by reference in its entirety.

In accordance with one embodiment of the present invention, a RF transaction using a RFID transaction device is secured by limiting the number of transactions which may be performed with a particular transaction device. Once the maximum transactions value is reached, transaction device may automatically disable itself against further usage. Alternatively, account issuer 112 may flag the transaction account correlating to transaction device such that account issuer system automatically prevents completion of transactions using transaction device As such, RFID transaction device 102 in accordance with the present invention further includes a counter 118 for recording and reporting the number of transactions performed with a particular transaction device 102. Counter 118 may be any device capable of being initiated with a beginning value and incrementing that value by a predetermined amount when transaction device 102 is presented for completion of a transaction. Counter 118 may be a discrete electronic device on the transponder, or may be software or code based counter as is found in the art.

The initial counter value may be any value from which other similar values may be measured. The value may take any form, such as, alpha, numeric, a formation of symbols, or any combination thereof.

To facilitate understanding, the following description discusses all values to be in numeric units (0, 1, 2, 3 . . . n). Thus, counter values, the value amount to be incremented, the total transactions counted value, and the maximum transactions value, are all whole numbers.

It should be noted that account issuer 112 may preset the initial counter value at any initial value as desired. Account issuer 112 may also predetermine the value amount to be incremented by counter 118 when transaction device is used to complete a transaction. Further, account issuer 112 may assign different values to be incremented for each distinct transaction device 102. Further still, account issuer 112 may determine the maximum transactions value, which may be particular to each individual transaction device 102 issued by account issuer 112. Where counter 118 value equals a maximum transactions value, the system 100 prevents the usage of transaction device 102 to complete additional transactions. Account issuer 112 may prevent the usage of transaction device 102 where account issuer flags the transaction account corresponding to transaction device 102, thereby preventing authorization for using the account to complete transactions. Alternatively, transaction device 102 may self-disable. For example, counter 118 value may trigger transaction device processor 114 to provide a signal for preventing the transfer of transaction device 102 identifier.

For example, account issuer 112 may preset the initial counter value at 5 units and counter value to be incremented at 10 units per transaction. Account issuer 112 may determine that transaction device 102 may be used to complete a total transaction value of 20 transactions. Since counter 118 increments counter value by the value to be incremented (e.g., 10 units) for each transaction, then for a total of 20 transactions permitted, the maximum transactions value will be 205 units. Once counter value equals 205 units, then the operation of transaction device 102 may be disabled.

Figure 2:
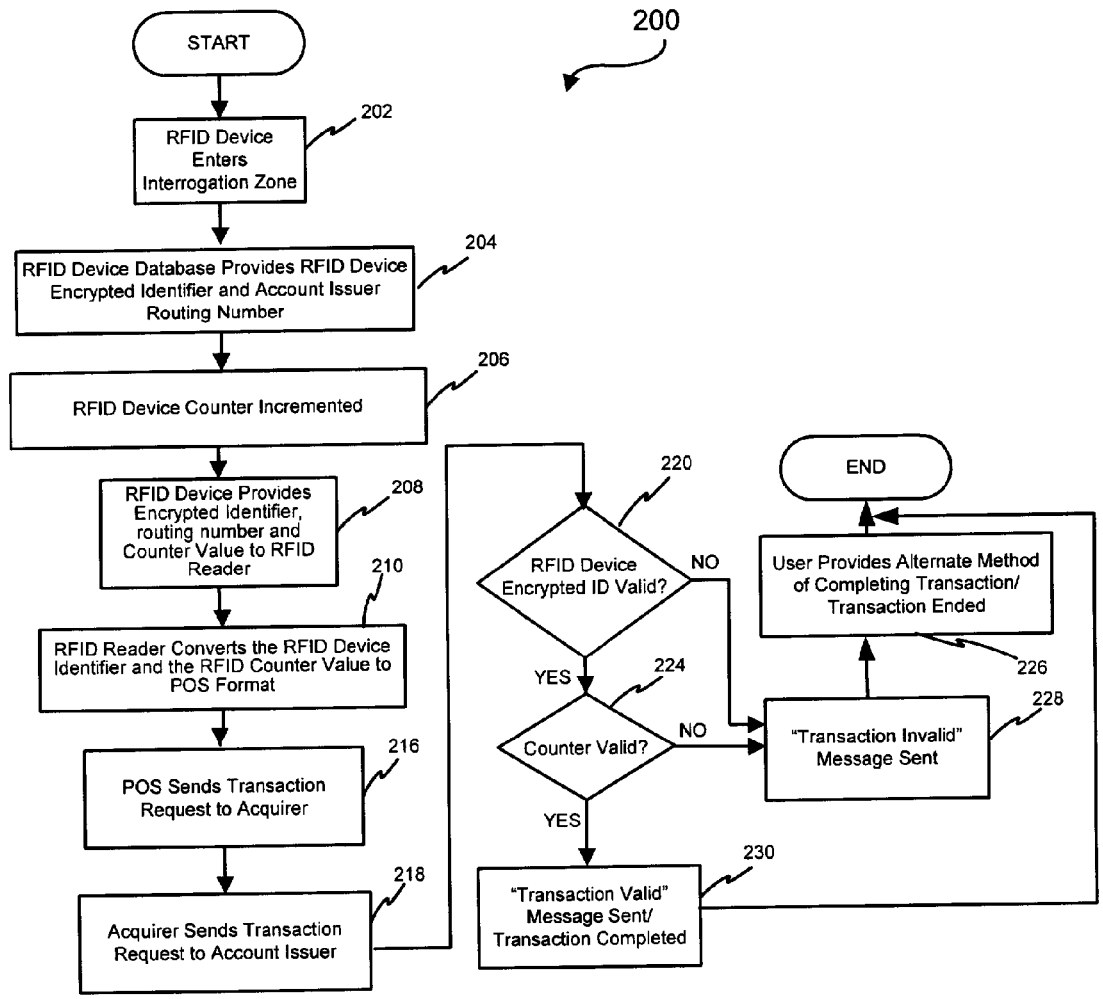
FIG. 2 illustrates an exemplary method for securing a RFID transaction using a counter-generated indicia in accordance with the present invention.

The operation of the exemplary embodiment described above, may be understood with reference to FIG. 1 and to the method of securing a RFID transaction described in FIG. 2. The operation may begin when RFID transaction device 102 is presented for completion of a transaction. Transaction device 102 may be placed in an interrogation field generated by RFID reader 104 (step 202). RFID reader 104 may interrogate RFID transaction device 102 enabling transaction device 102 operation. In response, RFID transaction device 102 may retrieve transaction device 102 identifier, account issuer 112 routing number and encrypted transaction device identifier from database 116 for providing to RFID reader 104 (step 204).

Once RFID transaction device 102 detects the interrogation signal provided by RFID reader 104, counter 118 may increment its counter value (step 206). Counter 118 value may be incremented by an amount predetermined by account issuer 112 (e.g., value amount to be incremented). The resulting counter 118 value after incrementing is the total transactions counted value.

Upon determining the total transactions counted value, RFID transaction device 102 may provide the total transactions counted value, the encrypted transaction device 102 identifier, and account issuer 112 routing number to RFID reader 104 via RF transmission (step 208). RFID reader 104 may, in turn, convert transaction device 102 identifier, routing number, and total transactions counted value into merchant POS recognizable format and forward the converted information to merchant POS 106 (step 210). A merchant system, including POS 106, may then provide a transaction request to acquirer 110 via network 106. The transaction request may include the information received from transaction device 102 along with information (e.g., amount, number of product, product/service identifier) concerning the transaction requested to be completed (step 216). The transaction request may include information relative to RFID reader 104.

Acquirer 110 may receive the transaction request and forward the transaction request to the appropriate account issuer 112 in accordance with the routing number provided (step 218). Account issuer 112 may then identify that a transaction request is being provided that relates to a transaction device. For example, merchant POS 106 may provide a code appended to the transaction request specially configured for identifying a transaction device transaction which may be recognized by account issuer 112. Alternatively, transaction device identifier, or a portion thereof, may be identified by account issuer 112 as originating with a RFID transaction device 102.

In one exemplary embodiment, account issuer 112 receives the transaction device 102 identifier and checks to see if the transaction device identifier corresponds to a valid transaction account maintained on account issuer 112 system (step 220). For example, account issuer 112 may receive the encrypted transaction device identifier and locate the corresponding decryption key relating to the transaction account. If the encrypted identifier is invalid, such as, for example, when account issuer 112 is unable to locate the corresponding decryption key, account issuer 112 may provide a "Transaction Invalid" message to POS 106 (step 228). Transaction device 102 user may then be permitted to provide an alternate means of satisfying the transaction, or the transaction is ended (step 230).

If the RFID transaction device 102 encrypted identifier corresponding decryption key is located, the encrypted identifier is considered "valid" and account issuer 112 may then use the corresponding decryption key to "unlock" or locate transaction device account correlative to transaction device 102. Account provider 112 may then retrieve all information relating to the usage limits which have been predetermined by account issuer 112. Account issuer 112 may be able to determine if a particular transaction device 102 has reached its limit of available transactions.

For example, account issuer 112 may check to see if the total transactions counted value equals or exceeds the maximum transactions allowed (step 224). If the maximum transactions allowed have been reached then counter value is met or exceeded, and the transaction is considered "invalid." As such, account issuer 112 may then provide a "Transaction Invalid" message to POS 106 (step 228). In addition, account issuer 112 may determine whether the total transactions counted value is the next expected value. If not, then the transaction is considered "invalid" and account issuer 112 may also provide a "Transaction Invalid" message to POS 106 (step 228). The transaction device 102 user may then be permitted to provide alternate means of completing the transaction (step 226) or the transaction is ended.

Alternatively, where the total transactions counted value does not exceed or meet the maximum transactions allowed value, counter value is considered valid and a "Transaction Valid" message is sent to merchant POS 106 (step 230). The merchant system may then complete the transaction under business as usual standards as are employed by the merchant.

In accordance with the various embodiments described, the present invention addresses the problem of securing a RF transaction completed by a RFID transaction device. The invention provides a system and method for an account issuer to determine if RFID transaction device is a valid device for completing a transaction on a RF transaction system. Account issuer can determine whether transaction device is valid by verifying transaction device counter, and encryption identifier. It should be noted, however, that the present invention contemplates various arrangements wherein RFID reader may also be validated.

Figure 3:
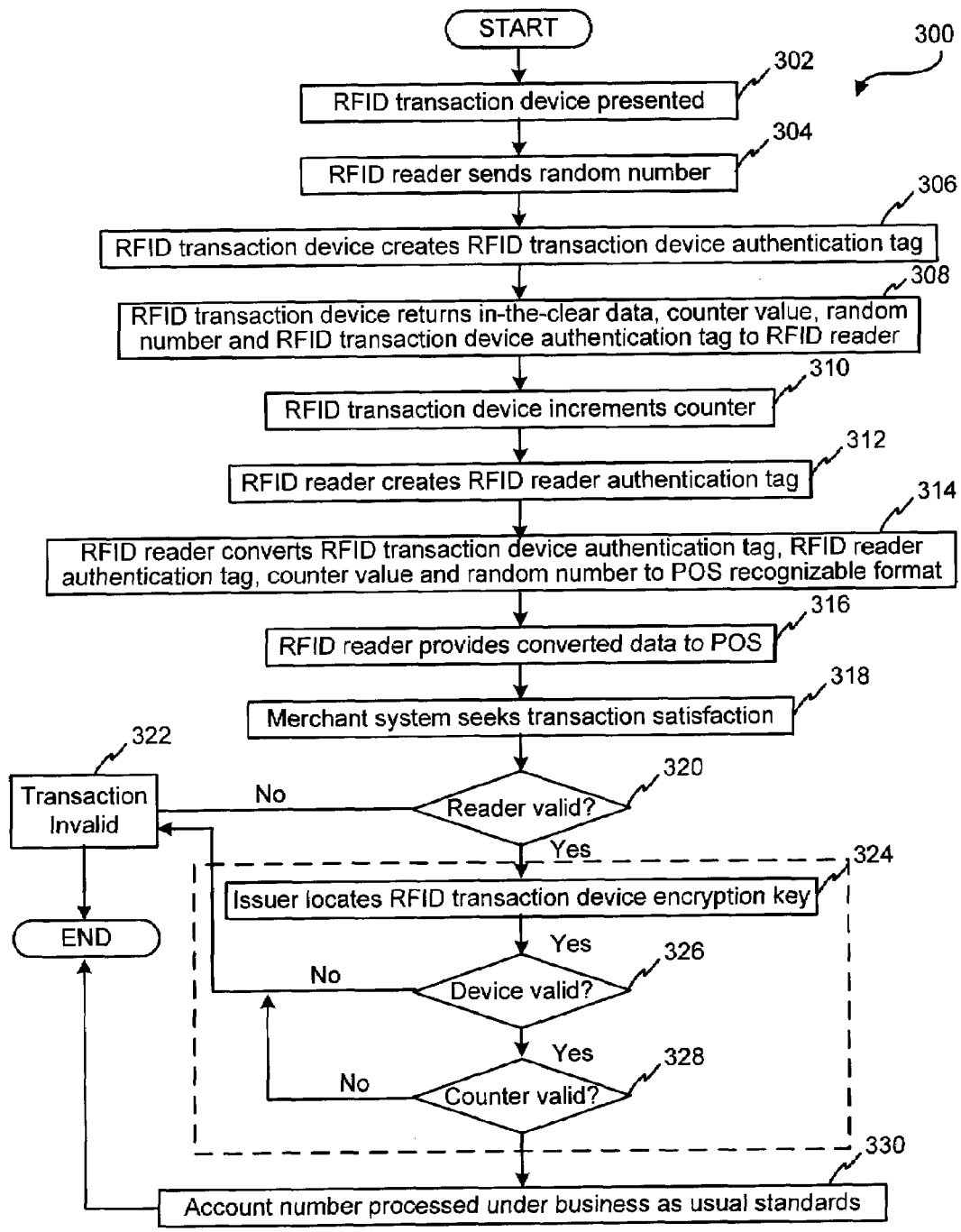
FIG. 3 depicts a flow diagram of an exemplary RFID transaction device and RFID reader authentication flow chart useful with this invention.

FIG. 3 illustrates another method 300 for usage of RFID transaction device counter 118 value for securing a RF transaction. In accordance with the method depicted, RFID reader 104 includes a random number generator 120, for producing a random number to be used in secure transactions. Random number generator 120 may be any conventional random number generator as is found in the art.

Method 300 may begin when a user presents RFID transaction device 102 for transaction completion (step 302). The user may, for example, place RFID transaction device 102 into the interrogation zone provided by RFID reader 104. The interrogation zone may be the area or zone defined by the interrogation signal cast by RFID reader 104.

Upon presentment of transaction device 102, RFID reader 104 may provide the random number to RFID transaction device 102 (step 304). RFID transaction device 102 may receive the random number and use it to create a RFID transaction device authentication tag (step 306). RFID transaction device 102 may receive the random number and use the random number, counter value, transaction account number and RFID transaction device encryption key to create a RFID transaction device authentication tag.

RFID transaction device 102 may provide RFID transaction device authentication tag to RFID reader 104. RFID transaction device 102 may also provide in-the-clear data, counter value, random number to RFID reader 104, along with RFID transaction device authentication tag (step 308). RFID transaction device processor 114 may increment counter 118 using any of the incrementing methods discussed above (step 310).

RFID reader 104 may receive the data provided by RFID transponder 102, and use the data to create a RFID reader authentication key using a RFID reader encryption key (step 312). RFID reader 104 may use the transaction data and RFID reader 104 encryption key to encrypt the authentication tag created by the RF transaction device using common techniques such as DES and Triple DES and pass the modified authentication tag together with the in-the-clear data, random number, counter value, modified RFID transaction device authentication tag, and RFID reader authentication tag into a format readable by POS 106 (step 314) and provide the converted data to POS 106 (step 316).

In an alternate embodiment, RFID reader 104 may receive the data provided by RFID transaction device 102, and use the data to create a RFID reader authentication key using a RFID reader encryption key (step 312). The reader authentication key is a digital signature created using the reader encryption key, RFID transaction device transaction data, and reader random number. RFID reader 104 may then pass the transaction data provided by the RF transaction device plus the reader authentication tag to POS 106.

POS 106 may seek satisfaction of the transaction (step 318). For example, POS 106 may form a transaction request using the data received from RFID transaction device 102, and RFID reader 104 encryption key and forward the transaction request to acquirer 110 who may forward the transaction request to account issuer 112 using the routing number.

Account issuer 112 may receive the transaction request and verify that RFID reader 104 and RFID transmission device 102 are valid. Account issuer 112 may validate RFID reader authentication tag by decrypting RFID reader authentication tag using a RFID reader encryption key stored on an account issuer database (not shown) (step 320). If the decryption is unsuccessful, then issuer system 112 may provide a "Transaction Invalid" message to POS 106 (step 322) and the transaction is terminated. Alternatively, if decryption is successful, issuer system 112 may seek to validate RFID transaction device authentication tag (step 332).

For example, account issuer 112 may use the RF transaction device account number to locate a RFID transaction device encryption key stored on the issuer 112 (step 324) database and use RFID transaction device encryption key to decrypt RFID transaction device authentication tag (step 326). If decryption is unsuccessful then issuer system 112 provides a "Transaction Invalid" message to POS 106 (step 322) and the transaction is terminated. Alternatively, if the decryption is successful, then issuer system 112 may validate counter value (step 328). Issuer system 112 may compare counter value to an expected counter value. In another exemplary embodiment, issuer system 112 may subject counter value received from RFID transaction device 102 to an algorithm the results of which are validated against an expected counter value. Issuer system 112 determines the expected value by referencing the algorithm used to increment counter value. For example, RFID transaction device 102 may have an algorithm (e.g., "counter algorithm") stored on transaction device database which may be used to increment counter value. In an exemplary embodiment, issuer system 112, stores a substantially similar copy of counter algorithm on issuer system 112 which is used to determine an expected counter value based on transactions known to issuer system 112. In some instances, the expected counter value and counter value are not the same. That is, there may be differences due to, for example, transactions being processed off-line using RFID transaction device 102. By "off-line" what may be meant is that the transaction is not immediately reported to issuer system 112. Instead, the transaction may be approved for processing without prior approval from issuer system 112, and issuer system 112 is notified of the transaction at a later date (e.g., not in real-time). In this case, counter algorithm may be such that a valid value is a value within an expected error range.

If counter value is unsuccessfully validated, then issuer system 112 may provide a "Transaction Invalid" message to POS 106. Otherwise, issuer system 112 may process the RFID transaction account number under business as usual standards (step 330). In this way, the transaction is secured using a counter, by using counter to validate a RFID transaction device authentication tag and a RFID reader authentication tag.

Figure 4:
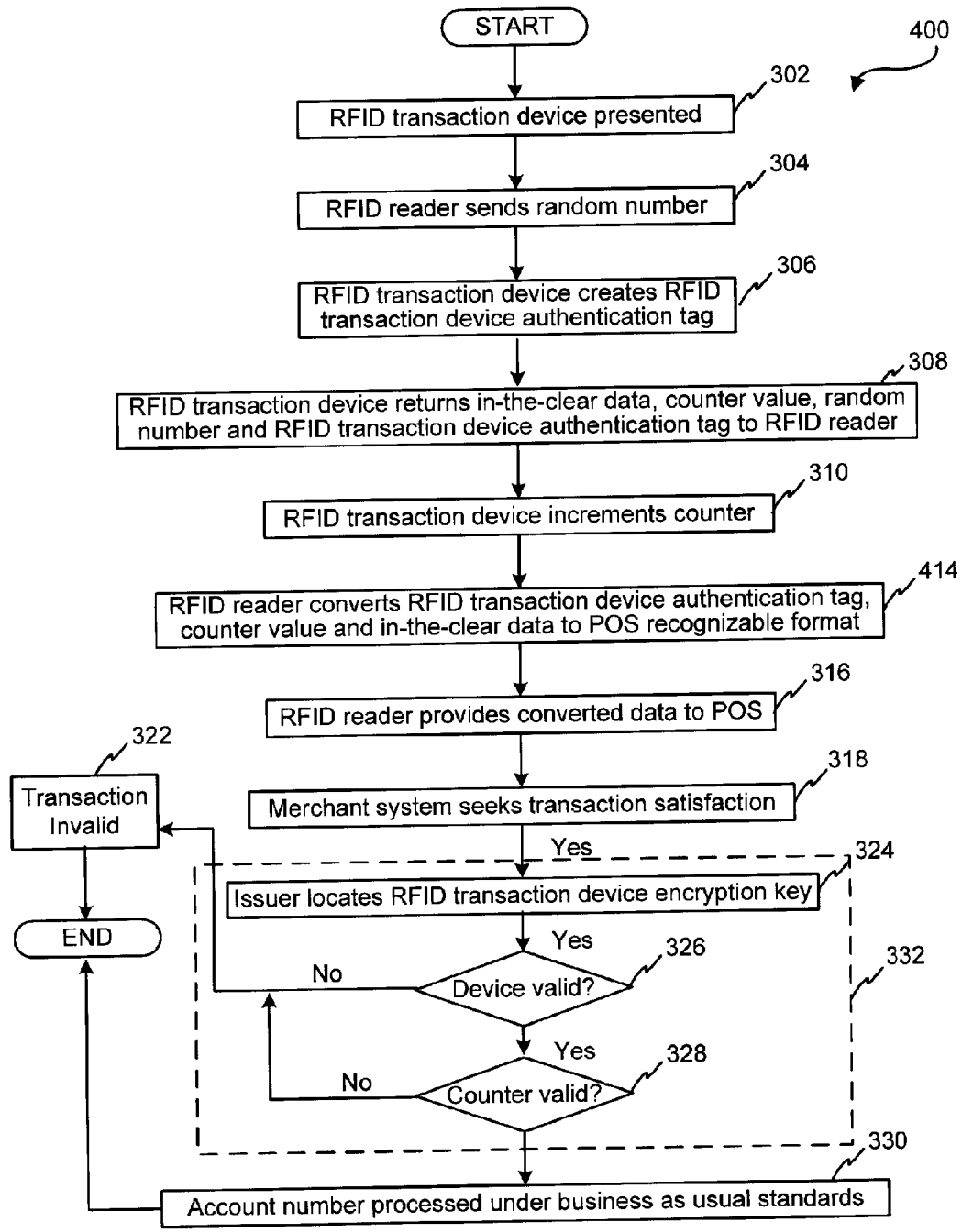
FIG. 4 depicts a flow diagram of an exemplary RFID transaction device authentication flow diagram useful with this invention.

FIG. 4 illustrates another exemplary embodiment wherein RFID transaction device 102 is validated using counter value. In this exemplary embodiment, RFID transaction device 102 is presented (step 302) and RFID reader 104 sends a random number to RFID transaction device 102 (step 304). RFID transaction device 102 receives the random number and creates a RFID transaction device authentication tag using the random number, the in-the-clear data, and a counter value (step 306). RFID transaction device 102 may then provide RFID transaction device authentication tag, random number, counter value, and in-the-clear data to RFID reader 104 (step 308). RFID transaction device 102 may increment counter value by a predetermined value (step 310).

RFID reader 104 may receive RFID transaction device authentication tag, in-the-clear data and counter value and convert counter value, in-the-clear data and RFID transaction device authentication tag to a merchant POS 106 format (step 414). RFID reader 104 may then provide the converted data to POS 106 (step 316). Merchant POS 106 may then provide the data received from RFID reader 104 to issuer system 112 for transaction satisfaction (step 318). Issuer system 112 may receive the data and verify RFID transaction device authentication tag (step 332). For example, issuer system 112 may validate the RFID transaction authentication tag and counter value in accordance with steps 324-328.

Figure 5:
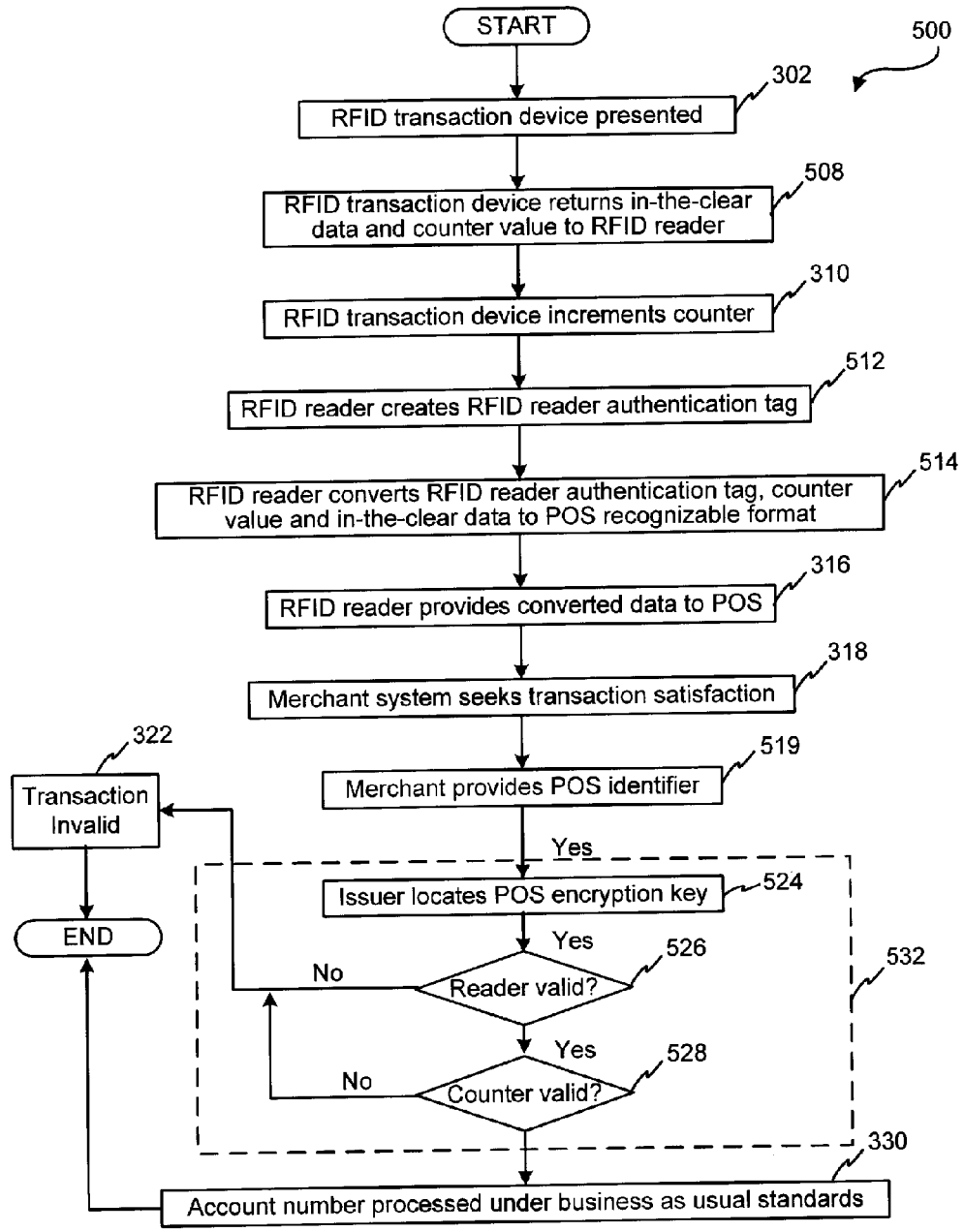
FIG. 5 depicts a flow diagram of an exemplary RFID reader authentication flow diagram useful with this invention.

Under yet another embodiment, FIG. 5 illustrates an aspect of the invention wherein RFID reader 104 is validated, when RFID transaction device 102 is not. According to the invention RFID transaction device 102 is validated using counter value. In this exemplary embodiment, RFID transaction device 102 is presented for transaction completion (step 302). RFID transaction device 102 may then provide counter and the in-the-clear data to RFID reader 104 (step 508). RFID transaction device 102 may increment counter value by a predetermined value (step 310). Alternatively, RFID reader 104 may provide a signal to transaction device 102 for use in incrementing the counter value.

RFID reader 104 may receive the in-the-clear data and counter value and prepare RFID reader authentication tag using a RFID reader encryption key (step 512). RFID reader may then convert the in-the-clear data and RFID reader authentication tag to a merchant POS 106 format (step 514) and provide the converted data to POS 106 (step 316). The merchant POS 106 may then provide the data received from RFID reader 104 to an issuer system 112 for transaction satisfaction (step 318). In one exemplary embodiment, the merchant POS 106 provides issuer system 116 with a POS identifier associated with POS 106 (step 519). Issuer system 116 may then seek to verify RFID reader 104 (step 532). For example, issuer system 112 may receive the POS identifier, and locate a related POS encryption key stored on an issuer system database (step 524). Issuer system 112 may receive the encryption key data and verify RFID reader authentication tag using the POS encryption key data (step 526). For example, issuer system 112 may validate the RFID transaction authentication tag by attempting to decrypt RFID reader authentication tag using the POS encryption key (i.e., step 526). If RFID reader authentication tag is successfully decrypted, then the transaction may be processed under business as usual standards (step 330). In another exemplary embodiment, prior to processing the transaction request (step 330), issuer system 112 may further verify RFID reader 104 by verifying counter value used to create the RFID authentication tag (step 528), in similar manner as was done with step 328.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, RFID reader may include an RFID reader encrypted identifier stored in the reader database, which may be validated by account issuer in similar manner as with transaction device encrypted identifier. Moreover, counter may increment the total transactions counted value by the predetermined incremental value at the completion of a successful transaction. In addition, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

What is claimed is:

1. A method, comprising:
receiving an authentication request from a radio frequency (RF) transaction device, wherein the authentication request comprises a total transactions counted value, and wherein the total transactions counted value represents a number of transactions associated with the RF transaction device;
denying the authentication request in response to the total transactions counted value exceeding a maximum transactions counted value; and
disabling the RF transaction device in response to the total transactions counted value exceeding the maximum transactions counted value.

2. The method of claim 1, wherein the authentication request further comprises at least one of an RF transaction device authentication tag, an account issuer routing number, or an encrypted transaction device identifier.

3. The method of claim 1, further comprising transmitting an interrogation signal to the RF transaction device.

4. The method of claim 1, further comprising:
transmitting the authentication request to a transaction processing entity; and
receiving a denial message from the transaction processing entity in response to the total transactions counted value exceeding the maximum transactions counted value.

5. The method of claim 1, further comprising:
presetting the total transactions counted value to an initial count value;
setting an increment value for the total transactions counted value; and
setting the maximum transactions counted value.

6. A radio frequency (RF) reader, comprising:
means for receiving an authentication request from an RF transaction device, wherein the authentication request comprises a total transactions counted value, and wherein the total transactions counted value represents a number of transactions associated with the RF transaction device;
means for denying the authentication request in response to the total transactions counted value exceeding a maximum transactions counted value; and
means for disabling the RF transaction device in response to the total transactions counted value exceeding the maximum transactions counted value.

7. The (RF) reader of claim 6, further comprising:
means for receiving an RF transaction device authentication tag from the RF transaction device; and
means for decrypting the RF transaction device authentication tag in order to authenticate the RF transaction device.

8. The (RF) reader of claim 7, further comprising:
means for producing an (RF) reader authentication tag using at least one of a RF transaction device authentication tag, a transaction account number, a random number, or the total transactions counted value, and an RF transaction device encryption key; and
means for converting at least one of the RF transaction device authentication tag, the transaction account number, the random number, the total transactions counted value, or the RF transaction device encryption key to a merchant point of sale recognizable format.

9. The (RF) reader of claim 6, further comprising:
means for receiving an encrypted transaction device identifier from the RF transaction device; and
means for decrypting the encrypted transaction device identifier in order to authenticate the RF transaction device.

10. A transaction processing entity, comprising:
means for receiving an authentication request from a radio frequency (RF) reader, wherein the authentication request is initiated by an RF transaction device, wherein the authentication request comprises a total transactions counted value, and wherein the total transactions counted value represents a number of transactions associated with the RF transaction device;
means for denying the authentication request in response to the total transactions counted value exceeding a maximum transactions counted value; and
means for disabling the RF transaction device in response to the total transactions counted value exceeding the maximum transactions counted value.

11. The transaction processing entity of claim 10, wherein the authentication request further comprises at least one of an RF reader authentication tag, an RF transaction device authentication tag, or an encrypted transaction device identifier.

12. The transaction processing entity of claim 10, further comprising means for validating the RF transaction device in accordance with an RF transaction device authentication tag.

13. The transaction processing entity of claim 10, further comprising means for evaluating validity of the RF reader in accordance with an RF reader authentication tag.

14. The transaction processing entity of claim 10, further comprising:
means for locating an RF reader encryption key using a merchant point of sale identifier, rehashing from an RF reader authentication tag, a transaction account number, the total transactions counted value, a random number, and an RF transaction device authentication tag using the RF reader encryption key;
means for verifying the RF transaction device using a corresponding RF transaction device encryption key;

means for verifying the total transactions counted value; and means for processing the authentication request where the RF reader authentication tag, RF transaction device authentication tag, and total transactions counted value are verified.

15. A method, comprising:

receiving an authentication request from a radio frequency (RF) reader, wherein the authentication request is initiated by an RF transaction device, wherein the authentication request comprises a total transactions counted value, and wherein the total transactions counted value represents a number of transactions associated with the RF transaction device;

denying the authentication request in response to the total transactions counted value exceeding a maximum transactions counted value; and disabling the RF transaction device in response to the total transactions counted value exceeding the maximum transactions counted value.

16. A method, comprising:

transmitting an authentication request to a radio frequency (RF) reader, wherein the authentication request comprises a total transactions counted value, wherein the total transactions counted value represents a number of transactions associated with an RF transaction device, and wherein the authentication request is denied in response to the total transactions counted value exceeding a maximum transactions counted value;

incrementing, at the RF transaction device, the total transactions counted value; and disabling the RF transaction device in response to the total transactions counted value exceeding the maximum transactions counted value.

17. The method of claim 16, further comprising incrementing the total transactions counted value by a selected value.

18. The method of claim 16, further comprising incrementing the total transactions .counted value in response to at least one of receiving an interrogation signal, transmitting data, or completing an RF transaction.

19. A radio frequency (RF) transaction device, comprising:

means for transmitting an authentication request to an RF reader, the authentication request comprising a total transactions counted value, wherein the total transactions counted value represents a number of transactions associated with the RF transaction device, and wherein the authentication request is denied in response to the total transactions counted value exceeding a maximum transactions counted value;

means for incrementing, at the RF transaction device, the total transactions counted value; and means for disabling the RF transaction device in response to the total transactions counted value exceeding the maximum transactions counted value.

20. The RF transaction device of claim 19, further comprising:

means for storing at least one of a transaction account number, a transaction account expiration date, or an RF transaction device encryption key;

means for receiving a random number and producing an RF transaction device authentication tag using at least one of the transaction account number, the transaction account expiration date, the RF transaction device encryption key, the random number, or the total transactions counted value; and means for transmitting at least one of the RF transaction device authentication tag, the RF transaction device encryption key, the random number, or the total transactions counted value to the (RF) reader.

21. A tangible computer-readable medium having stored thereon computer-executable instructions that, if executed by a computing device, cause the computing device to perform a method comprising:

receiving an authentication request from a radio frequency (RF) transaction device, wherein the authentication request comprises a total transactions counted value, and wherein the total transactions counted value represents a number of transactions associated with the RF transaction device;

denying the authentication request in response to the total transactions counted value exceeding a maximum transactions counted value; and disabling the RF transaction device in response to the total transactions counted value exceeding the maximum transactions counted value.

22. A tangible computer-readable medium having stored thereon computer-executable instructions that, if executed by a computing device, cause the computing device to perform a method comprising:

receiving an authentication request from a radio frequency (RF) reader, wherein the authentication request is initiated by an RF transaction device, wherein the authentication request comprises a total transactions counted value, and wherein the total transactions counted value represents a number of transactions associated with the RF transaction device;

denying the authentication request in response to the total transactions counted value exceeding a maximum transactions counted value; and disabling the RF transaction device in response to the total transactions counted value exceeding the maximum transactions counted value.

23. A tangible computer-readable medium having stored thereon computer-executable instructions that, if executed by a computing device, cause the computing device to perform a method comprising:

transmitting an authentication request to a radio frequency (RF) reader, wherein the authentication request comprises a total transactions counted value, wherein the total transactions counted value represents a number of transactions associated with an RF transaction device, and wherein the authentication request is denied in response to the total transactions counted value exceeding a maximum transactions counted value;

incrementing, at the RF transaction device, the total transactions counted value; and disabling the RF transaction device in response to the total transactions counted value exceeding the maximum transactions counted value.

* * * * *

UNITED STATES PATENT AND TRADEMARK OFFICE
CERTIFICATE OF CORRECTION

| | | |
|---|---|---|
| PATENT NO. | : 7,705,732 B2 | Page 1 of 1 |
| APPLICATION NO. | : 10/905005 | |
| DATED | : April 27, 2010 | |
| INVENTOR(S) | : Fred Bishop et al. | |

It is certified that error appears in the above-identified patent and that said Letters Patent is hereby corrected as shown below:

On the Title Page, Item (76) the inventors' full addresses are inappropriately listed on the face of the patent. City, State and Country should be listed only.

Claim 18, column 15, line 38, "transactions.counted" should be changed to --transactions counted--.

Signed and Sealed this

Twenty-fourth Day of August, 2010

David J. Kappos
*Director of the United States Patent and Trademark Office*